US007483842B1

(12) United States Patent
Fung et al.

(10) Patent No.: US 7,483,842 B1
(45) Date of Patent: Jan. 27, 2009

(54) SYSTEM AND METHOD FOR DETERMINING RECOMMENDED ACTION BASED ON MEASURING AND ANALYZING STORE AND EMPLOYEE DATA

(75) Inventors: Kin Chung Fung, Needham, MA (US); R. David Nurme, Brookline, MA (US); Antoinette Yacobian, Weston, MA (US); Michael Yacobian, Weston, MA (US)

(73) Assignee: The Yacobian Group, Maynard, MA (US)

( * ) Notice: Subject to any disclaimer, the term of this patent is extended or adjusted under 35 U.S.C. 154(b) by 1077 days.

(21) Appl. No.: 10/081,020

(22) Filed: Feb. 21, 2002

Related U.S. Application Data

(60) Provisional application No. 60/270,563, filed on Feb. 21, 2001.

(51) Int. Cl.
*G06F 11/34* (2006.01)

(52) U.S. Cl. ........................................................ 705/11
(58) Field of Classification Search .................. None
See application file for complete search history.

(56) References Cited

U.S. PATENT DOCUMENTS

| | | | | | |
|---|---|---|---|---|---|
| 5,111,391 | A | * | 5/1992 | Fields et al. | 705/9 |
| 5,138,638 | A | * | 8/1992 | Frey | 377/6 |
| 5,684,964 | A | * | 11/1997 | Powers et al. | 705/11 |
| 5,722,418 | A | | 3/1998 | Bro | 128/732 |
| 5,726,914 | A | * | 3/1998 | Janovski et al. | 702/84 |
| 5,808,908 | A | | 9/1998 | Ghahramani | 364/551.01 |
| 5,810,747 | A | | 9/1998 | Brudny et al. | 600/595 |

(Continued)

FOREIGN PATENT DOCUMENTS

WO   WO 97/13229   *   4/1997

(Continued)

OTHER PUBLICATIONS

Ford, Brian, Point-of-Sale: The Future Is the By-Product Retail Control, vol. 50, No. 1, Dec. 1981, Abstract.*

(Continued)

*Primary Examiner*—Scott L. Jarrett
(74) *Attorney, Agent, or Firm*—Bingham McCutchen LLP

(57) ABSTRACT

In a retail business environment, sales employees interact with customers and generate retail sales. Employee skills, product knowledge, and performance are particularly relevant to sales generated, and hence to cash flow. Periodic assessments are typically performed to monitor the progress and growth of the business and to identify areas of strength and flag potential weaknesses. Such assessments typically take the form of sales data outlining generated revenue, for example, gross receipts or the net profit of a particular employee or store. A system for measuring and analyzing performance data including collecting data indicative of performance and analyzing the data to compute an aggregate synopsis of performance of an employee provides quantitative data for providing employee specific feedback and direction to the employee for improving performance. A hypothesis is formed from the aggregate synopsis to determine one or more actions, such as training and skill practice, directed to improving performance. The determined actions are pursued with the employee under evaluation, and a change in the performance as a result of applying the actions is measured. Measurement and analysis is repeated in an iterative manner to continually assess and develop employee skills toward increased performance and hence, increased sales.

55 Claims, 23 Drawing Sheets

U.S. PATENT DOCUMENTS

| | | | | |
|---|---|---|---|---|
| 5,823,781 | A * | 10/1998 | Hitchcock et al. | 434/118 |
| 5,832,458 | A * | 11/1998 | Jones | 705/14 |
| 5,909,669 | A * | 6/1999 | Havens | 705/11 |
| 5,953,707 | A | 9/1999 | Huang et al. | 705/10 |
| 5,954,510 | A | 9/1999 | Merrill et al. | 434/236 |
| 5,980,429 | A * | 11/1999 | Nashner | 482/8 |
| 5,987,443 | A * | 11/1999 | Nichols et al. | 706/11 |
| 6,016,486 | A | 1/2000 | Nichols | 706/47 |
| 6,029,159 | A | 2/2000 | Zorba et al. | 706/47 |
| 6,049,779 | A * | 4/2000 | Berkson | 705/14 |
| 6,115,693 | A * | 9/2000 | McDonough et al. | 705/10 |
| 6,119,097 | A * | 9/2000 | Ibarra | 705/11 |
| 6,125,358 | A | 9/2000 | Hubbell et al. | 706/11 |
| 6,151,582 | A | 11/2000 | Huang et al. | 705/8 |
| 6,157,808 | A | 12/2000 | Hollingsworth | 434/350 |
| 6,201,948 | B1 * | 3/2001 | Cook et al. | 434/350 |
| 6,275,812 | B1 * | 8/2001 | Haq et al. | 705/11 |
| 6,324,282 | B1 * | 11/2001 | McIllwaine et al. | 379/265.06 |
| 6,589,055 | B2 * | 7/2003 | Osborne et al. | 434/219 |
| 6,633,851 | B1 * | 10/2003 | Engler et al. | 705/21 |
| 6,732,079 | B1 * | 5/2004 | Kintner et al. | 705/8 |
| 6,970,810 | B1 * | 11/2005 | Matsko | 702/187 |
| 7,035,808 | B1 * | 4/2006 | Ford | 705/7 |
| 7,093,748 | B1 * | 8/2006 | Matsko et al. | 235/377 |
| 2001/0008999 | A1 | 7/2001 | Bull | |
| 2001/0011280 | A1 | 8/2001 | Gilbert et al. | |
| 2001/0032120 | A1 * | 10/2001 | Stuart et al. | 705/11 |
| 2001/0032195 | A1 * | 10/2001 | Graichen et al. | 705/400 |
| 2001/0034730 | A1 * | 10/2001 | Bhandari et al. | 707/7 |
| 2001/0056367 | A1 * | 12/2001 | Herbert et al. | 705/11 |
| 2002/0010563 | A1 * | 1/2002 | Ratteree et al. | 703/2 |
| 2002/0035500 | A1 * | 3/2002 | Yoko et al. | 705/9 |
| 2002/0038235 | A1 * | 3/2002 | Musafia et al. | 705/11 |
| 2003/0229529 | A1 * | 12/2003 | Mui et al. | 705/8 |

FOREIGN PATENT DOCUMENTS

WO      WO 01/2597 A1 * 4/2001

OTHER PUBLICATIONS

Grant, Rebecca A. et al., Computerized Performance Monitors as Multidimensional Systems: Derviation and Application ACM Transactions on Information Systems, vol. 14, No. 2, Apr. 1996.*
Kahn, Robert J., Tailor-made training Sales and Marketing Management, vol. 149, No. 3, Mar. 1997, pp. 66-72.*
Graff, Kevin et al., Winning retail : a self assessment and instructional guide for independent retailers Industry Canada, Service Industries, 1997, OCLC: 49914092.*
Capillo, Joe, Sales Performance Accountability Furniture World, Jul. 1, 1998.*
Kaydos, Will, Operational Performance Measurement: Increasing Total Productivity CRC Press, LLC., 1999, ISBN: 1-57444-099-3.*
Fitz-Enz, Jac, The Mythology of Measuring Staff Performance Canadian Business Review, vol. 20, No. 1, Sprin 1993.*
Jones, Steven D., Work Group Performance Measurement and Feedback Group & Organization Studies, Sep. 1993, vol. 18, No. 3.*
Jacobs, Bill, Operating stores; High octane execution Chain Store Age with Shopping Center Age, vol. 70, No. 1, Jan. 1994.*
Achieving Organizational Excellenace Through the Perforamnce Measurement System American Productivity & Quality Center, 1999.*
Turning data in knowledge Chain Store Age, Jan. 1996.*
Donthu, Naveen et al., Retail Productivity Assessment Using Data Envelope Analysis Journal of Retailing; vol. 74, no. 1, Sprin 1998.*
Jensen, Anne J. et al., A Systems Management Approach for Improvement of Organization Perforamnce Measurement Systems Information-Knowledge-Systems Management, vol. 2, No. 2, Jan. 2000.*
Simons, Robert, Performance Measurement & Control Systems for Implementing Strategy Prentice Hall, 2000, ISBN: 0-13-234006-2.*
Harrison, Chuck, Using In-Store Systems to Achieve a Competitive Advantage Retail Control, vol. 59, No. 1, Jan. 1991, Abstract.*
Athanasspolous, Antreas D., Performance Improvement Decision Aid Systems (PIDAS) in Retailing Organizations Using Data Envelopment Analysis, The Journal of Productivity Analysis, vol. 6, 1995.*
Pearce, Michael R., The Retail Performance Dynamic Ivey Business Quarterly, vol. 62, No. 4, Summer 1998.*
Thomas, Rhonda R. et al., A process for evaluating retail store efficiency: a restricted DEA approach International Journal of Research in Marketing, vol. 15, 1998.*
Taylor, Albert J., Salespersons and sales managers: A Descriptive Early Study of Topics and Perceptions of Retail Sales Performance Appraisals, Human Resource Development Quarterly, Vol. 10, No. 3, Fall 1999.*

* cited by examiner

| Transaction Analysis | | Weekly Opportunity Analysis 218' | | | | | | | | | | | | |
|---|---|---|---|---|---|---|---|---|---|---|---|---|---|---|
| | | Totals By Hour | | | | | | | | | | | | |
| Totals | | 9-10 | 10-11 | 11-12 | 12-1 | 1-2 | 2-3 | 3-4 | 4-5 | 5-6 | 6-7 | 7-8 | 8-9 | 9-10 | Other Hours |
| Associates on Duty | | 6 | 6 | 6 | 0 | 0 | 0 | 1 | 1 | 1 | 1 | 1 | 1 | 1 | 3 |
| Transactions | 1,255 | 0 | 25 | 88 | 141 | 162 | 177 | 180 | 142 | 129 | 79 | 73 | 40 | 19 | 0 |
| Non-transactions | 5,040 | 63 | 213 | 390 | 435 | 622 | 615 | 675 | 563 | 451 | 385 | 284 | 175 | 108 | 60 |
| Foot Traffic | 6,295 | 63 | 238 | 476 | 576 | 784 | 792 | 855 | 705 | 580 | 464 | 357 | 215 | 127 | 60 |
| Conv % | 20 | 0 | 11 | 18 | 24 | 21 | 22 | 21 | 20 | 22 | 17 | 20 | 19 | 15 | 0 |
| | | Sales Transactions By Hour | | | | | | | | | | | | |
| Number / Name Description | # of Trans | 9-10 | 10-11 | 11-12 | 12-1 | 1-2 | 2-3 | 3-4 | 4-5 | 5-6 | 6-7 | 7-8 | 8-9 | 9-10 | Other Hours |
| 000018 Discount | 13 | - | - | - | - | - | - | - | 1 | 1 | 3 | 2 | 3 | 3 | 0 |
| 000026 House | 19 | - | - | 3 | 6 | 6 | 2 | 1 | 0 | 0 | 1 | - | 0 | - | 0 |
| 000030 Unknown | 87 | 0 | 0 | 6 | 13 | 8 | 15 | 13 | 12 | 9 | 9 | 1 | 1 | 0 | 0 |
| Associate | | | | | | | | | | | | | | | |
| E3 Associate | 4 | - | 1 | - | 0 | 0 | 1 | 0 | 1 | - | - | - | - | - | 0 |
| E4 Associate 4 | 178 | - | - | 11 | 18 | 14 | 29 | 41 | 22 | 20 | 10 | 5 | 4 | 4 | 0 |
| E5 Associate | 13 | - | - | - | - | - | - | - | - | - | - | 4 | 6 | 3 | 0 |
| E6 Store Manager | 0 | 0 | 0 | 0 | 0 | 0 | 0 | 0 | 0 | 0 | 0 | 0 | 0 | - | 0 |
| E2 Associate 2 | 180 | - | 11 | 23 | 20 | 30 | 29 | 23 | 24 | 19 | 1 | - | - | - | 0 |
| E7 Associate | 10 | 0 | 0 | 0 | 2 | 7 | 0 | 1 | 0 | - | - | - | - | - | 0 |
| E1 Associate 1 | 260 | - | 9 | 28 | 32 | 43 | 35 | 19 | 21 | 28 | 24 | 17 | 4 | - | 0 |

*FIG. 8d*

Development Analysis

Associate  E1  }—202

| Productivity Summary | Gross Sales | Return Sales | Net Sales | Goal | Goal Var $ | Proactive Sales | SPH | DPT | UPT | TPH | # of Trans | Hrs |
|---|---|---|---|---|---|---|---|---|---|---|---|---|
| MTD Total | 110,058 | (246) | 109,812 | - | - | 0 | - | 150 | 2.5 | 324 | 730 | 2 |
| YTD Total | 265,451 | (2,366) | 263,084 | - | - | 0 | - | 146 | 2.4 | 800 | 1,800 | 2 |

220 ⟵ Productivity Summary
222 ⟵ {columns SPH through Hrs}
224 ⟶ DPT
226 ⟶ UPT
228 ⟶ TPH

*FIG. 8e*

Performance Ranking

| Number / Name | Gross Sales (000s) | Return Sales (000s) | Net Sales (000s) | Goal (000s) | Goal Var $ (000s) | LY Net Sales (000s) | Proact Sales (000s) | % Total Sales | SPH | DPT | UPT | # of Trans (000s) | Foot Traffic (000s) | Conv % | Hours (000s) |
|---|---|---|---|---|---|---|---|---|---|---|---|---|---|---|---|
| Connecticut / NY | 3,326 | (729) | 2,597 | 2,711 | (114) | - | 0 | 0 | 2,817 | 83 | 1.9 | 31 | 73 | 29 | 1 |
| MA / RI | 3,318 | (767) | 2,551 | 2,510 | 40 | - | 0 | 0 | 3,353 | 78 | 1.8 | 33 | 156 | 18 | 1 |
| Boston | 2,852 | (569) | 2,283 | 2,798 | (515) | 600 | 0 | 0 | 2,033 | 81 | 1.9 | 28 | 127 | 21 | 1 |
| New England | 1,795 | (344) | 1,451 | 1,327 | 123 | - | 0 | 0 | 1,769 | 83 | 1.9 | 17 | 81 | 20 | 1 |

FIG. 8g

Monthly Trending Analysis

Productivity — 250

| Number / Name | 2001 Period 10 Actual | Goal | 2001 Period 9 Actual | Goal | 2001 Period 8 Actual | Goal | 2001 Period 7 Actual | Goal | 2001 Period 6 Actual | Goal | 2001 Period 5 Actual | Goal |
|---|---|---|---|---|---|---|---|---|---|---|---|---|
| Total | | | | | | | | | | | | |
| Net Sales | 8,881,717 | 9,346,925 | 27,470 | 9,802,627 | 0 | 12,077,480 | - | 6,378,590 | - | 6,792,985 | - | 10,244,393 |
| SPH | 2,450 | - | 10 | - | 0 | - | - | - | - | - | - | - |
| DPT | 81 | - | 96 | - | - | - | - | - | - | - | - | - |
| UPT | 1.9 | - | 2.2 | - | - | - | - | - | - | - | - | - |
| TPH | 30 | - | 0 | - | - | - | - | - | - | - | - | - |
| Conv % | 23 | - | 1 | - | - | - | - | - | - | - | - | - |
| Connecticut / NY | | | | | | | | | | | | |
| Net Sales | 2,596,960 | 2,711,111 | 0 | 2,763,975 | 0 | 3,418,083 | - | 1,695,117 | - | 1,963,114 | - | 2,958,411 |
| SPH | 2,817 | - | 0 | - | 0 | - | - | - | - | - | - | - |
| DPT | 83 | - | - | - | - | - | - | - | - | - | - | - |
| UPT | 1.9 | - | - | - | - | - | - | - | - | - | - | - |
| TPH | 34 | - | - | - | - | - | - | - | - | - | - | - |
| Conv % | 30 | - | 0 | - | 0 | - | - | - | - | - | - | - |
| Boston | | | | | | | | | | | | |
| Net Sales | 2,283,313 | 2,798,237 | 22,098 | 3,280,156 | 0 | 3,985,591 | - | 2,156,003 | - | 2,072,636 | - | 3,271,754 |
| SPH | 2,033 | - | 38 | - | 0 | - | - | - | - | - | - | - |
| DPT | 81 | - | 103 | - | - | - | - | - | - | - | - | - |
| UPT | 1.9 | - | 2.3 | - | - | - | - | - | - | - | - | - |
| TPH | 25 | - | 0 | - | - | - | - | - | - | - | - | - |
| Conv % | 22 | - | 1 | - | - | - | - | - | - | - | - | - |
| MA / RI | | | | | | | | | | | | |
| Net Sales | 2,550,825 | 2,510,361 | 78 | 2,500,513 | 0 | 3,118,615 | - | 1,589,860 | - | 1,706,599 | - | 2,652,819 |
| SPH | 3,353 | - | 0 | - | 0 | - | - | - | - | - | - | - |
| DPT | 78 | - | 78 | - | - | - | - | - | - | - | - | - |
| UPT | 1.8 | - | 1.0 | - | - | - | - | - | - | - | - | - |
| TPH | 43 | - | 0 | - | - | - | - | - | - | - | - | - |
| Conv % | 21 | - | - | - | - | - | - | - | - | - | - | - |
| New England | | | | | | | | | | | | |
| Net Sales | 1,450,619 | 1,327,216 | 5,294 | 9,345,925 | 0 | 1,555,191 | - | 937,610 | - | 1,050,636 | - | 1,361,409 |
| SPH | 1,769 | - | 8 | - | 0 | - | - | - | - | - | - | - |
| DPT | 83 | - | 77 | - | - | - | - | - | - | - | - | - |
| UPT | 1.9 | - | 2.0 | - | - | - | - | - | - | - | - | - |
| TPH | 21 | - | 0 | - | - | - | - | - | - | - | - | - |
| Conv % | 22 | - | 1 | - | - | - | - | - | - | - | - | - |

Learning History

Associate   E1

| Curriculum Description | Sequence Description | Course Description | Test Score | Start Date | Computer Date | Last Access Date | Course Time |
|---|---|---|---|---|---|---|---|
| Client Relationship | Associate Level | Associate Level Evaluation | 100 | 05/16/2001 | 05/21/2001 | 05/21/2001 | 1.5 |
| Client Relationship | Advisor Level | Advisor Level Evaluation | 100 | 07/16/2001 | 07/23/2001 | 07/23/2001 | 1.5 |
| Client Relationship | Consultant Level | Consultant Level Evaluation | 100 | 09/16/2001 | 09/25/2001 | 09/25/2001 | 1.5 |

FIG. 8j

Associate

| # Trans | UPT | DPT | Action(s) |
|---|---|---|---|
| L | L | L | 1 + 2 + 3 |
| L | L | A | 1 + 2 |
| L | L | H | 1 + 2 |
| L | A | L | 1 + 2 |
| L | A | A | 1 + 2 |
| L | A | H | Congratulate on good job with the clients you work with<br>1 + 2 |
| L | H | L | 1 + 2 |
| L | H | A | 1 + 2 |
| L | H | H | Congratulate on good job with the clients you work with<br>1 + 2 |
| A | L | L | 3 |
| A | L | A | 3 |
| A | L | H | 3 |
| A | A | L | 3 |
| A | A | A | Congratulate on good job<br>3 |
| A | A | H | Congratulate on good job<br>3 |
| A | H | L | 3 |
| A | H | A | Congratulate on good job<br>3 |
| A | H | H | Congratulate on good job<br>3 |
| H | L | L | 3 |
| H | L | A | 3 |
| H | L | H | 3 |
| H | A | L | 3 |
| H | A | A | Congratulate on great job<br>3 |
| H | A | H | Congratulate on great job<br>3 |
| H | H | L | Congratulate on great job |
| H | H | A | Promotion Candidate |
| H | H | H | Promotion Candidate |

L = Low, A = Average, H = High

| 1 = Preparing Yourself | 2 = Engaging Client | 3 = Sharing Information |

*FIG. 9a*

Advisor

| UPT | # Trans | DPT | Action(s) |
|---|---|---|---|
| L | L | L | 1 + 2 |
| L | L | A | 1 + 2 |
| L | L | H | 1 + 2 |
| L | A | L | 1 + 2 |
| L | A | A | 1 + 2 |
| L | A | H | 1 + 2 |
| L | H | L | 1 + 2 |
| L | H | A | 1 + 2 |
| L | H | H | 1 + 2 |
| A | L | L | 3 + 2 |
| A | L | A | 3 + 2 |
| A | L | H | 3 + 2 |
| A | A | L | 3 + 2 |
| A | A | A | Congratulate on good job<br>3 |
| A | A | H | Congratulate on good job<br>3 |
| A | H | L | 2 |
| A | H | A | Congratulate on good job |
| A | H | H | Congratulate on good job |
| H | L | L | 3 |
| H | L | A | 3 |
| H | L | H | 3 |
| H | A | L | Congratulate on great job |
| H | A | A | Congratulate on great job<br>Possible Promotion for Candidate |
| H | A | H | Congratulate on great job<br>Possible Promotion for Candidate |
| H | H | L | Promotion Candidate |
| H | H | A | Promotion Candidate |
| H | H | H | Promotion Candidate |

520

L = Low, A = Average, H = High

| 1 = Understanding Needs | 2 = Creating Solutions | 3 = Balancing Experiences |

Consultant

| # Phone Contacts | # Appts | # Clients | Action(s) |
|---|---|---|---|
| L | L | L | 1 + 2 |
| L | L | A | 1 + 2 |
| L | L | H | 1 + 2 |
| L | A | L | 1 |
| L | A | A | 1 |
| L | A | H | 2 + 1 |
| L | H | L | 1 |
| L | H | A | Congratulate on working well proactively with client; find out why low phone contact |
| L | H | H | Congratulate on working well proactively with client; find out why low phone contact |
| A | L | L | 2 + 1 |
| A | L | A | 2 |
| A | L | H | 2 |
| A | A | L | 2 + 1 |
| A | A | A | 2<br>Congratulate on good job |
| A | A | H | 2<br>Congratulate on good job |
| A | H | L | 2 + 1 |
| A | H | A | 2<br>Congratulate on good job |
| A | H | H | 2<br>Congratulate on good job |
| H | L | L | 2 + 1 |
| H | L | A | 2 |
| H | L | H | 2 |
| H | A | L | 2 + 1 |
| H | A | A | 2<br>Key player to leverage & possibly promote |
| H | A | H | 2<br>Key player to leverage & possibly promote |
| H | H | L | Key player to leverage and promote and find out why low clients<br>1 |
| H | H | A | Key player to leverage and promote |
| H | H | H | Key player to leverage and promote |

L = Low, A = Average, H = High

| 1 = Offering Services | 2 = Delighting Clients | 3 = Driving Business |

*FIG. 9c*

Level: Store

| Usage of DCE Tools | Sales Associate Issues | Team Composition | Action(s) |
|---|---|---|---|
| N | L | L | Congratulate on good job 3 |
| N | L | A | Congratulate on great job |
| N | L | H | Congratulate on good job 3 |
| N | A | L | 3 |
| N | A | A | No action - watch for improvement |
| N | A | H | 3 |
| N | H | L | 2 + 3 |
| N | H | A | 2 |
| N | H | H | 2 + 3 |
| Y | L | L | 1 + 3 |
| Y | L | A | 1 |
| Y | L | H | 1 + 3 |
| Y | A | L | 1 + 3 |
| Y | A | A | 1 |
| Y | A | H | 1 + 3 |
| Y | H | L | SM needs immediate help. 1 + 2 + 3 |
| Y | H | A | SM needs immediate help. 1 + 2 |
| Y | H | H | SM needs immediate help. 1 + 2 + 3 |

N = No, Y = Yes

L = Low/Under staffed, A = Average/Appropriately staffed, H = High/Over staffed

1 = Phone SM and schedule store visit to dicuss learning tools
2 = Plan store visit and coach SM to prepare individual development plan
3 = Plan quarterly/semi-annual store visit to review personnel strategy and development plan

*FIG. 9d*

SYSTEM AND METHOD FOR DETERMINING RECOMMENDED ACTION BASED ON MEASURING AND ANALYZING STORE AND EMPLOYEE DATA

RELATED APPLICATION(S)

This application claims the benefit of U.S. Provisional Application No. 60/270,563, filed on Feb. 21, 2001. The entire teachings of the above application(s) are incorporated herein by reference.

BACKGROUND OF THE INVENTION

In a business environment, periodic assessments are typically performed to monitor the progress and growth of the business and to identify areas of strength and flag potential weaknesses. In a retail business environment, such assessments typically take the form of sales data outlining generated revenue, such as the gross receipts or the net profit of a particular store.

A business environment includes a number of employees, each contributing their skills and knowledge to further the business. Maximum productivity and efficiency occurs when each employee is functioning to utilize their skills and knowledge to their fullest potential. An employee undertaking a role that does not invoke all their skills and knowledge may be underutilized, while an employee having insufficient skill or knowledge for a particular role will likely not be productive or efficient.

Periodic assessment of the contribution of each employee is typically performed to identify achievement for items such as bonuses and merit increases. Such an assessment is reported to a central home office or accounting office. However, employee specific feedback concerning skills and knowledge is typically not communicated back to the employee for future development. Achievement may be recognized in the form of a bonus or large merit increase, while shortfalls may be met with a lower than average merit increase. Employee specific feedback regarding skill and knowledge development, and tracking employee development over time, is not provided. Further, some organizations may not even communicate employee specific sales data to the home office, but rather employ only global figures for a particular site or store, leaving the individual employee merit determinations up to the local manager.

Accordingly, a typical periodic assessment does not provide individual direction through formal training and proactive skill development. It would be beneficial to provide a system in which employee specific feedback and direction is provided in an iterative manner to develop individual skills and knowledge to increase productivity and efficiency, which in turn increases sales and revenue and allows the business to grow.

SUMMARY OF THE INVENTION

In a retail business environment, sales employees interact with customers and generate retail sales. A system and method for measuring and analyzing performance data including collecting transaction data indicative of performance factors, and analyzing the transaction data to compute an aggregate synopsis of performance of a subject under observation, or employee, provides quantitative data for providing feedback to the subject under observation for improving performance. A hypothesis is formed from the aggregate synopsis to determine one or more recommended actions directed to improving performance. The determined recommended actions are applied to the subject under observation, and a change in the performance as a result of applying the recommended actions is measured. Measuring and analyzing is repeated in an iterative manner to continually assess and develop employee skills toward increased performance and hence, increased sales.

The transaction data collected includes field performance data to determine sales per hour, revenue per sale transaction and total customer flow, training data such as applied curriculum and skill development provided by the system, and external legacy data such as corporate administrative, retail store and human resource data. The aggregate synopsis provides quantitative performance scores within an expected performance range, and is employed to develop a hypothesis for improvement. The aggregate synopsis may be provided via predetermined reports aimed at identifying specific performance areas, or may be provided through ad-hoc reports generated via a query engine.

The hypothesis is developed by a rule based expert systems, by manual inspection of the aggregate synopsis, or by other means, and is used to map the performance score to one or more recommended actions. The recommended actions are directed toward multimedia educational curriculum and identified skills to be developed. A feedback mechanism, such as collection and analysis of subsequent transactional data, is employed to assess the effectiveness of the determined recommended actions.

The transactional data is collected in a data store including a relational database of raw transaction data and a knowledge base including an aggregated transformation of the transaction data in a multidimensional database. The multidimensional database renders the data in an on-line analytical processing (OLAP) form adapted for hierarchical (drill-up/drill-down) access at a variety of granularity levels, as is known to those skilled in the art.

The aggregated synopsis outputs a performance score indicative of a ranking within a performance range of expected scores in the experience category of the sales employee, such as low, medium, and high. A mapping is performed including the ranking and the experience category, and may include other factors such as store attributes and customer throughput. The mapping includes associating skills, knowledge, and sales data to recommended actions for improving performance. A hypothesis is developed concerning identified areas for improvement, and mapped to a predetermined set of recommended actions for developing the identified areas.

The recommended actions include skills for practice on the sales floor and review or training via a learning center. The learning center provides a library of multimedia curriculum including magnetic, optical, and printed mediums of instruction and feedback, and is specifically designed to target the identified skills and knowledge for improvement.

In this manner, performance data concerning a sales employee is gathered and analyzed, and areas for improvement identified. The identified areas are addressed by recommended actions via a manager or coach, and developed through the learning center. Iterative application of skill and knowledge development allows feedback to be introduced to target and revisit specific areas for each sales employee. Improvement is measured by examining the transaction data at each cyclic application, thereby identifying increased performance and revenue in response to the applied recommended actions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8a-8j show reports generated by the system of FIG. 4;

FIGS. 9a-9d are performance matrices for mapping of performance scores to recommended actions.

DETAILED DESCRIPTION OF THE INVENTION

A description of preferred embodiments of the invention follows.

Figure 1:
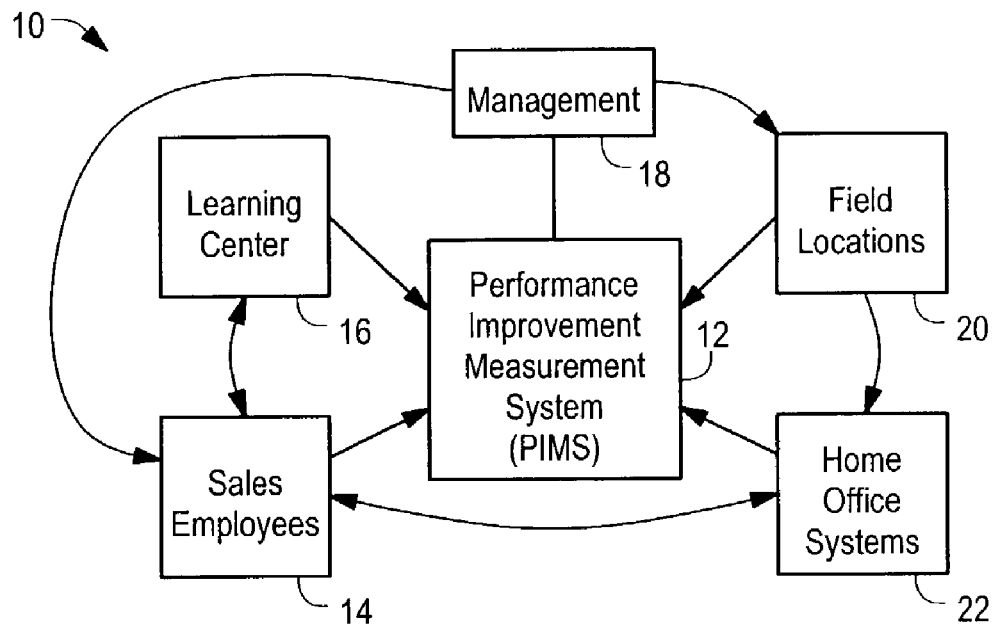
FIG. 1 is a context diagram of the performance improvement measurement system (PIMS) as defined herein.

In a retail sales environment, a system and method for measuring and analyzing transaction data of sales activity allows individual feedback to be provided to each employee concerning specific actions for knowledge and skill development for improving performance. FIG. 1 shows a context diagram of the Performance Improvement Measurement System (PIMS). Referring to FIG. 1, PIMS 12 is shown in the business environment 10 context. The environment 10 includes employee associates or sales employees 14, a learning center 16 for implementing the skill and knowledge development, described further below, corporate management 18, a plurality of field locations 20, typically retail stores, each with a point of sale (POS) data system for gathering field data, and home office computing systems 22, providing information such as revenue goals, accounting, and human resource data.

Figure 2:
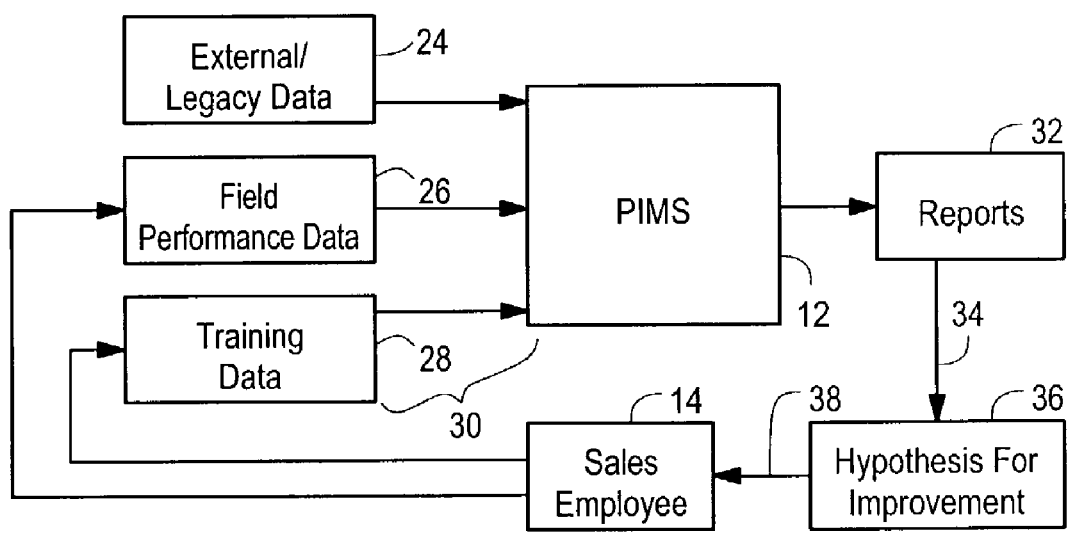
FIG. 2 is a block diagram of PIMS inputs and outputs.

FIG. 2 shows a block diagram of inputs and outputs of the system 12. Referring to FIG. 2, the system 12 receives data from a plurality of sources, including external and legacy data 24 from the home office such as corporate administrative and human resource data, field performance data 26 including POS data, and training data 28 such as educational curricula provided by a learning center and associated learning progress, described further below. The raw data 30 received by the system is employed to produce reports 32 containing a quantitative analysis of the raw data, also described further below. The reports 32 provide an aggregated synopsis of the raw data, shown by arrow 34, organized at different levels of granularity, which are used to generate a hypothesis for improvement 36 for a subject under observation, such as an sales employee 14 (FIG. 1). The hypothesis for improvement 36 determines particular skills or knowledge which the sales employee should improve on, based on the reports 32, and indicates specific recommended actions to be undertaken, shown by arrow 38. The recommended actions 38 selected are focused on the particular knowledge and/or skills which the individual employee should further develop, and include simple coaching from management, skills to practice at the retail location, or specific coursework curriculum to be initiated or reviewed. The recommended actions 38 are undertaken by the particular sales employee 14. A subsequent evaluation will gather data from each of the sources 24, 26 and 28 to produce periodically updated sets of raw data 30 for reevaluation after application of the recommended actions 38.

Figure 3:
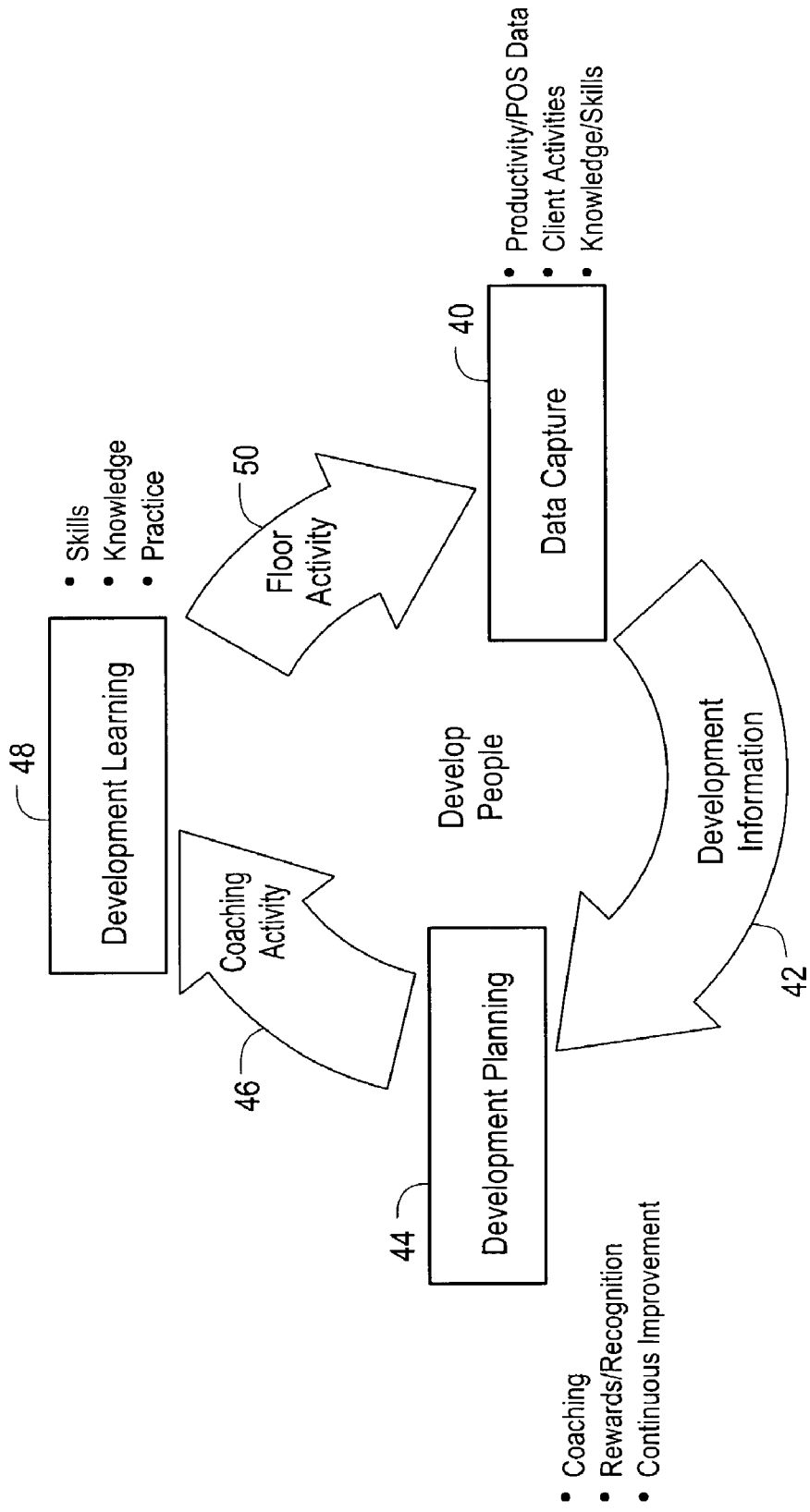
FIG. 3 is a diagram of the iterative data and information flow in the system of FIG. 2.

FIG. 3 is a diagram of the iterative data and information flow in the system of FIG. 2. Referring to FIGS. 2 and 3, a data capture phase 40 includes gathering the raw data 30 from the data sources 24, 26, and 28. The reports 32 generated from the raw data comprise development information 42 about each subject under observation. Development planning 44 includes developing a hypothesis for improvement 36, and may include other aspects such as staffing and business goals. The development planning 44 is implemented via coaching activity 46, which includes applying the determined recommended actions 38 to the employee 14n. The coaching activity 46 results in developmental learning 48, including skills, knowledge, and practice. The developmental learning is applied by floor activity 50, in which the sales employee 14 applies and demonstrates the result of the developmental learning 48. The information and data flow therefore follows a full feedback cycle through PIMS which continually monitors performance and determines steps for improvement.

Figure 4:
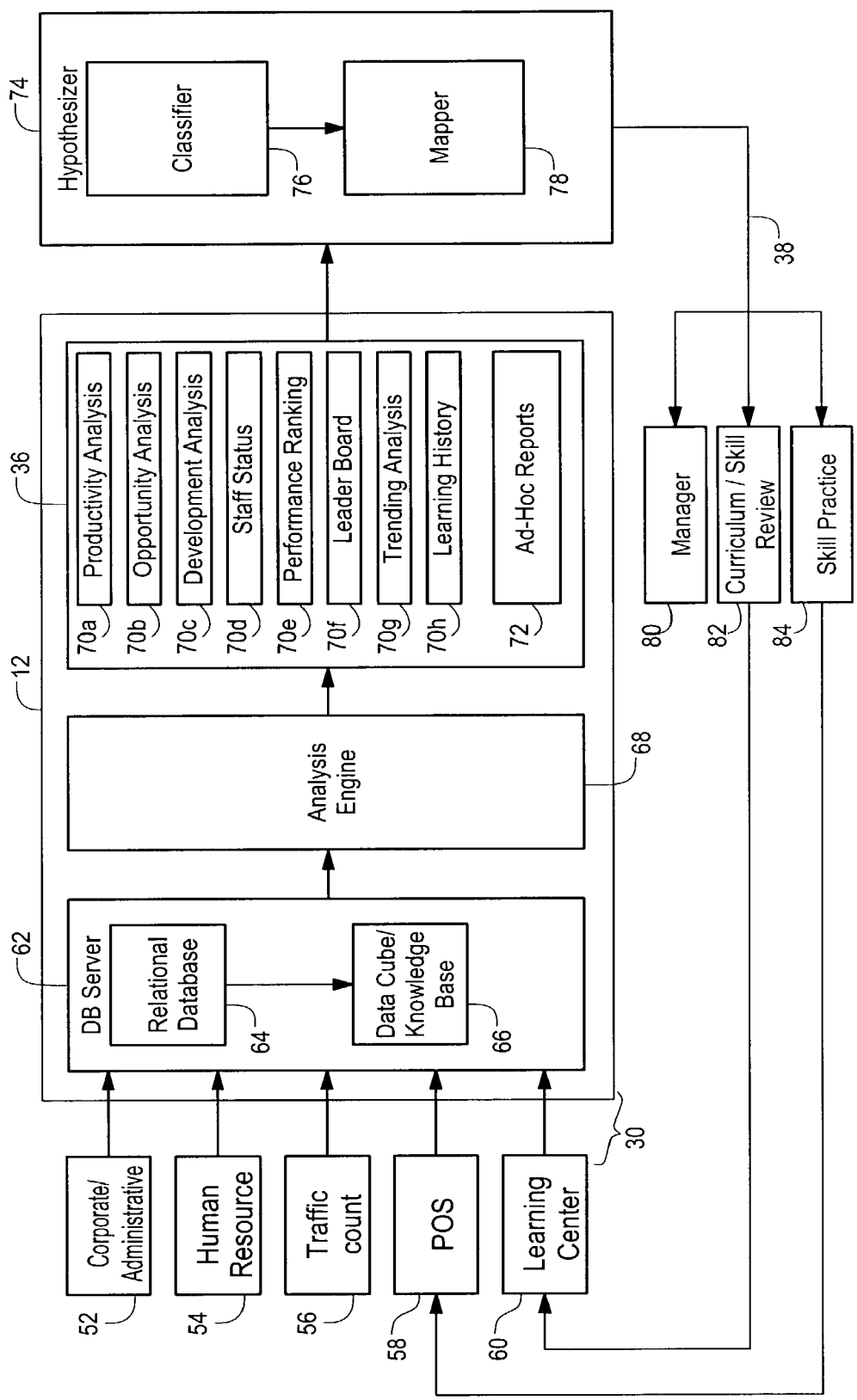
FIG. 4 is a block diagram of the system of FIG. 2 showing data population and analysis in greater detail.

FIG. 4 is a block diagram of a particular embodiment of the system of FIG. 2 showing data population and analysis in greater detail. Referring to FIG. 4, the transaction data is gathered from several sources. External and legacy data (24, FIG. 2) further comprises corporate administrative 52 and human resource 54 data. Field performance data (26, FIG. 2) further comprises customer traffic count 56 and point-of-sale (POS) data 58, and training data (28, FIG. 2) further comprises learning center 60 data, described further below.

The system 12 includes a database server 62 which receives the transaction data via the raw data interface 30. The raw data interface is an offline batch interface which periodically uploads the transaction data by a variety of means, but may also comprise a real-time connection. The database server 62 includes a relational database 64 and a multidimensional knowledge base 66. The transaction data 52, 54, 56, 58, and 60 is stored in the relational database 64, and a subset of the data translated to a multidimensional form in the knowledge base 66. The knowledge base stores the data in a data cube manner operable for on-line analytical processing (OLAP) manipulation by an OLAP processor as is known to those skilled in the art. The knowledge base allows the data to be aggregated and extracted in a drill-up/drill down manner as required by the reports, described further below.

An analysis engine 68 incorporated within the reporting function operates to access the transaction data 32 via the database server 62 for generating reports 32 (FIG. 2). The reports include a set of standard reports 70 a-h and ad-hoc reports 72. The standard reports, 70 generally, contain an aggregate synopsis of quantitative computations about a particular subject under observation, such as an employee or retail store, according to a predetermined sequence of computations, and are described further below with respect to FIGS. 8a-8j. The standard reports 70 are typically computed in real-time on demand. The ad-hoc reports 72 are provided via a third party reporting tool to retrieve the data from the database server 62. In either case the reports 36 are employed in developing a hypothesis from which to derive developmental planning for the subject under observation.

The reports 36, from among the standard reports 70, are invoked by a hypothesizer 74. The hypothesizer 74 interprets the quantitative information in the reports 36 to allow qualitative comparisons and conclusions to be determined. The reports 36 include a number of fields about a subject under observation. Each field in the report has a performance score about the subject under observation. For each field, there is also a performance range indicative of a typical score and the variation from that score. A classifier 76 in the hypothesizer 74 compares the performance score to the performance range to derive a performance rank of the subject under observation for the concerned field. The performance rank is enumerated into several tiers across the performance range. In a particular embodiment the performance rank may have three tiers of low, average, and high (L, A, H), indicative of the performance of the subject under observation in that performance field. In alternate embodiments the performance rank may have other tiers, such as a two tiered yes/no (Y,N) scale or a ten point scale, for example.

Each of the reports can be generated on a variety of levels of granularity, including granularity with respect to scope and with respect to time. Specifically, reports can be generated per employee, store, district, region, division, and company. Reports can also be generated to cover timing intervals including daily, weekly, monthly, quarterly, and yearly progress.

The classifier 76, therefore, indicates a set of performance ranks concerning a particular subject under observation for a plurality of fields. For the particular subject under observation, the performance ranks are employed along with a type of the subject under observation to map to recommended actions (38, FIG. 2) to be taken to improve the performance of the subject under observation. The type of the subject under observation includes sales employees and retail stores. Further, sales employees include the types of associate, advisor, and consultant. A mapper 78 in the hypothesizer 74 receives the performance ranks and the type of the subject under test to map to the recommended actions 38. Based on the performance ranks and the type of the subject under observation, one or more recommended actions 38 are determined from the mapping. In a particular embodiment, the mapping is a matrix form, described further below, which correlates the type of the subject under observation, the performance ranks, and the recommended actions. Other factors could be employed.

The operation performed by the hypothesizer 74 can be performed in several ways. In a particular embodiment, the quantitative reports are manually inspected and compared to the expected performance range. The mapping further comprises reference to the matrix of possible values and a listing of the corresponding recommended actions. Manual inspection in this manner further allows qualitative assessments to be made regarding performance rankings within the expected performance range. In alternate embodiments, the hypothesizer 74 comprises an expert system (not shown) which receives the performance scores and type of the subject under observation, and computes the recommended actions according to a rule-based mechanism.

The recommended actions 38 determined by the hypothesizer 74 indicate skills and knowledge which the subject under observation excels at, and should be rewarded for, and those for which improvement is called for. The recommended actions are sent to a manager 80 of the subject under observation for review and implementation. The recommended actions also indicate specific curriculum or review 82 to be undertaken at the learning center 60. The learning center has a variety of curricula targeted at improvement of specific knowledge or skills indicated by the recommended actions. The recommended actions may also indicate skills and knowledge for practice 84, to be undertaken at the point of sale 58. Depending on the particular recommended action, manager 80 involvement, curriculum review 82 at the learning center, or skills and knowledge for practice 84, or a combination, may be indicated. Manager 80 involvement in decision making for implementing the recommended actions 38 from among the variety of curricula available via the learning center provides another level of qualitative assessment for the skill and knowledge development of the subject under observation.

Figure 5:
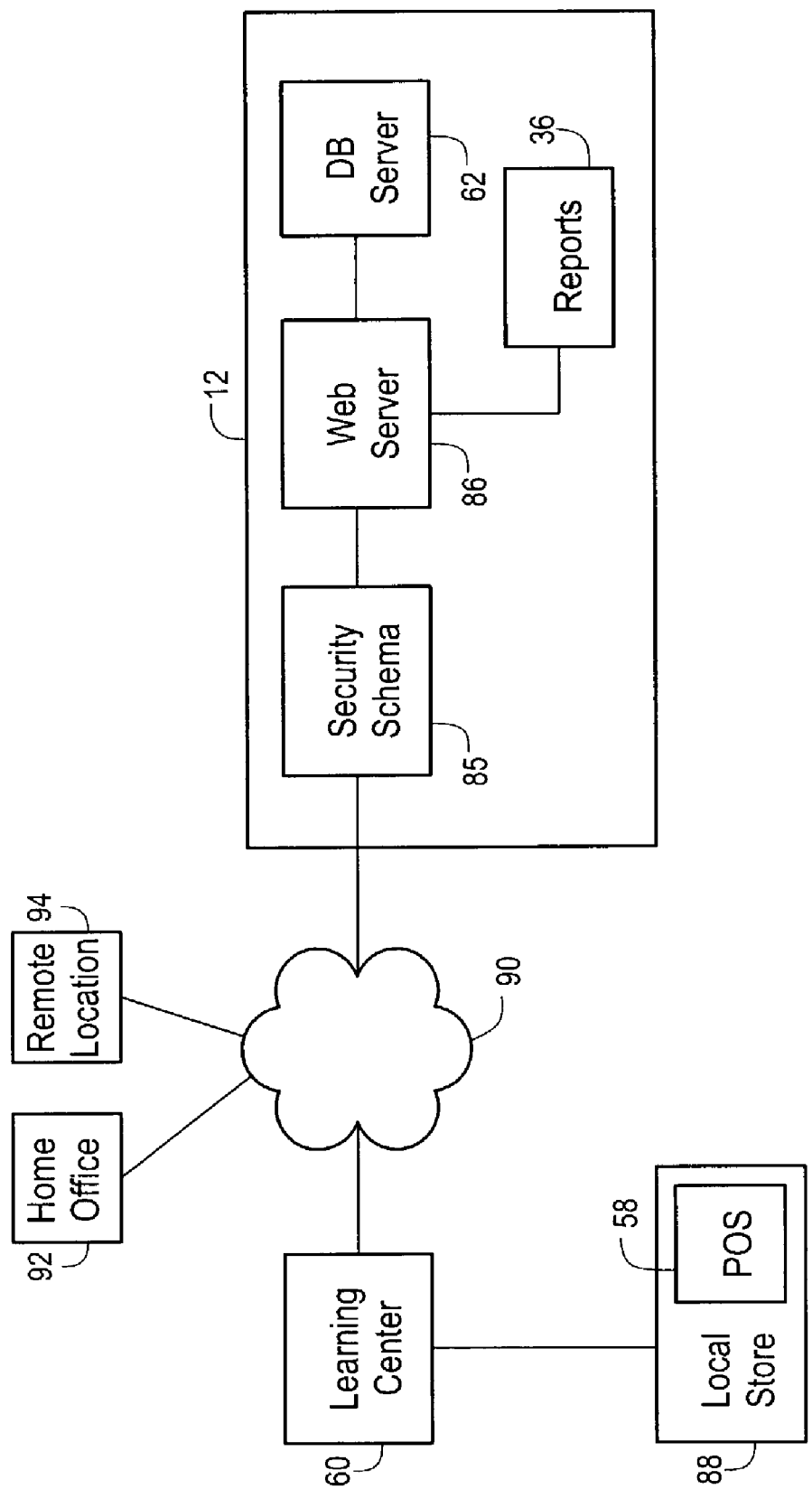
FIG. 5 is a block diagram of report output retrieval.

FIG. 5 is a block diagram of output retrieval. Referring to FIGS. 4 and 5, a manager 80 may access the system reports 36 via a variety of connections, such as the local store system 88, a home office 92, or other remote location 94. The local store system 88, may, for example, also include the POS system 58 for the local store. Access to PIMS 12 occurs via a web/user interface 86 to access the reports 36 over the Internet 90 or other remote access network. A security schema 85, described further below, is employed to regulate access to PIMS 12.

The security schema 85 defines a role and privilege mechanism for viewing data from PIMS 12. Users are authenticated through a password or other authentication process. For each user, privileges are defined based on the user's role within the organization, their need-to-know, and the tenuity and specificity of the data sought. For example, a new entry-level associate might be able to access their own performance scores, but not those of a colleague. Similarly, a manager needs to have access to data and reports concerning all sales employees under her, but need not have access to employee sales data from another region outside their responsibility. Other rules and checks can also be employed in the security schema.

The learning center 60 comprises multimedia educational curricula focused at improving the specific skills and knowledge of the sales employee. The particular curriculum is selected based on the determined recommended action. The curriculum may be delivered electronically on the display of the learning center 60 from DVDs (Digital Video Discs), CDs (Compact Discs), and other optical and magnetic media, by print medium, such as workbooks and texts, or by a combination. Curriculum feedback such as exercises and tests may likewise be provided by a plurality of mediums. In this manner, the learning center represents a library of educational resources including software, visual, audio, and printed mediums designed and tailored to address a particular skill or knowledge targeted for improvement. In a particular embodiment, the learning center is a library of multimedia educational curricula marketed commercially by The Yacobian Group, LLC of Maynard, Mass., however, other developmental mechanisms for addressing skill and knowledge improvement may also be employed.

Figure 6:
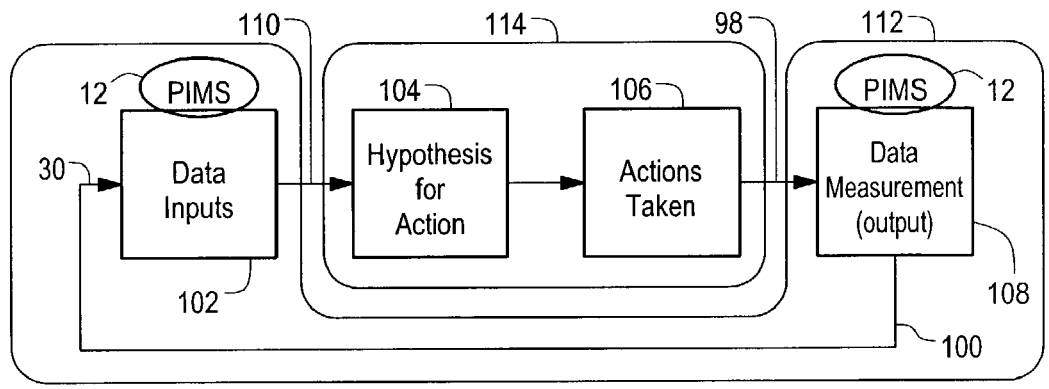
FIG. 6 is a data flow diagram of the development cycle iteration.

FIG. 6 is a data flow diagram of the development cycle iteration similar to the data described above with respect to FIG. 6. The association of PINS analysis is shown in relation to the multimedia learning center 60 activities aimed at improving the skills and knowledge of the subject under observation. Referring to FIGS. 6 and 4, the PIMS data inputs 102 are received via the transactional data interface, and comprise the transactional data sources 52, 54, 56, 58, and 60. The PIMS output 110 includes the reports 36 and is employed in developing further hypotheses for improvement 104. The recommended actions 38 suggested by the hypothesis are taken 106, and the feedback mechanism 98 employed for the subsequent data measurement 108 via PIMS 12. The output 100 comprises fresh transaction data 30 which complements the iterative cycle. The gathering, analysis and processing occurs within PIMS as shown by the line 112, while the hypothesizing and actions occur in conjunction with the learning center 60, as shown by the line 114.

Figure 7A:
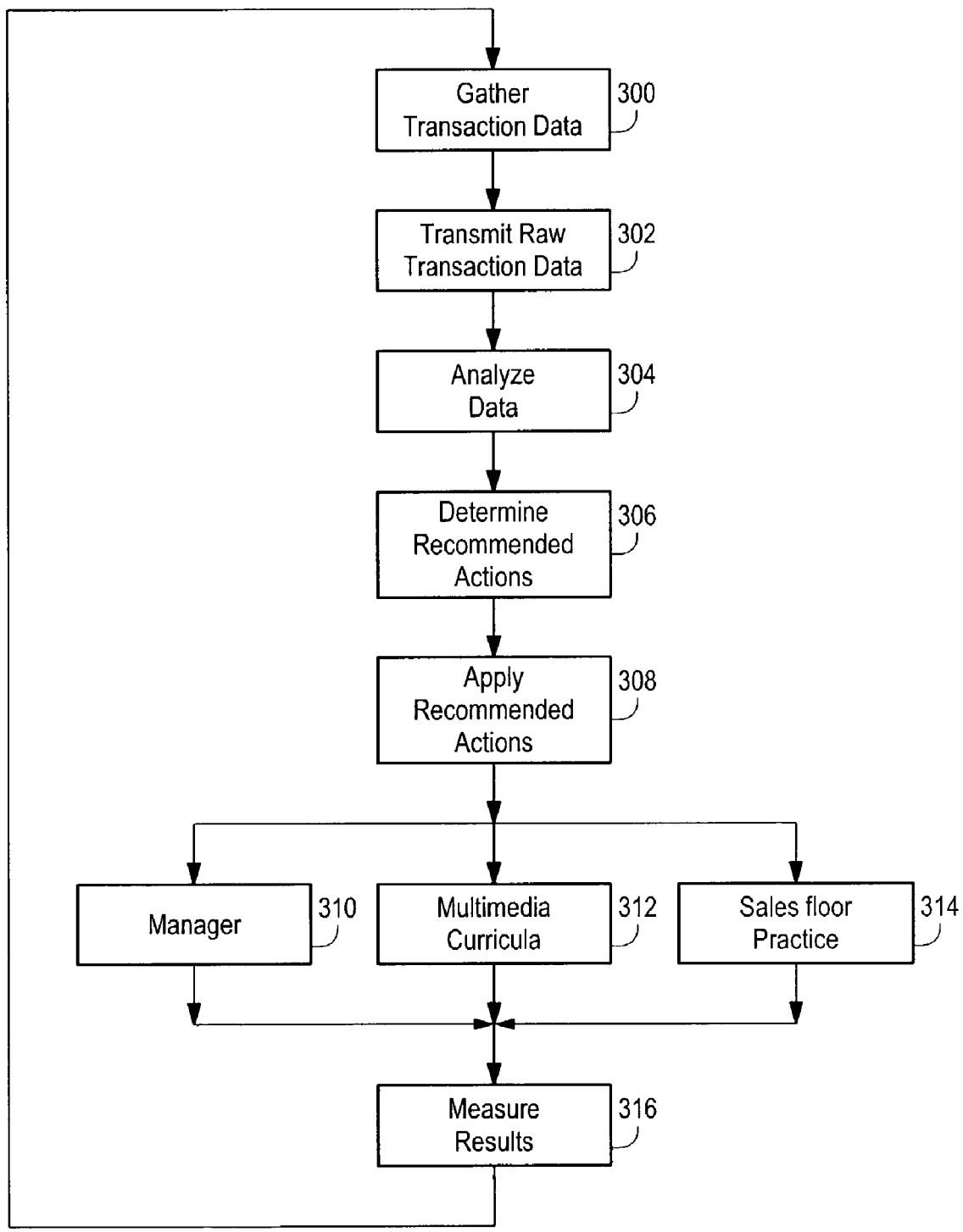
FIG. 7a is a flowchart of the operation of the system of FIG. 4.

FIGS. 7a-7d show flowcharts of the operation of PIMS system of FIG. 4. Referring to FIGS. 7a and 4, transaction data is gathered from a plurality of sources, as depicted at step 300. The raw transaction data is transmitted via an interface 30 to the database server 62, as shown at step 302. The analysis engine 62 analyzes the data from the database server 62 to generate quantitative reports 36, as depicted at step 304. As indicated above, the reports may take a variety of forms, including the standard reports 70 predetermined to correspond to typical performance fields, and ad-hoc reports 72, designed to allow custom queries by the user. The reports 36 are employed by a hypothesizer 74 to determine recommended actions 38 for improving skills and knowledge as proscribed by the reports, as disclosed at step 306. From the hypothesizer, the recommended actions 38 are applied, as depicted at step 308. The recommended actions may be implemented by a manager 80, through multimedia curricula 82 via the learning center 60, or by skill practice 84, on the sales floor, as disclosed at steps 310, 312, and 314, respectively. Following implementation, the results are measured as transaction data during the next gathering of transaction data gathering, as depicted at step 316, and control reverts to step 300 for further analysis in an iterative manner.

Figure 7B:
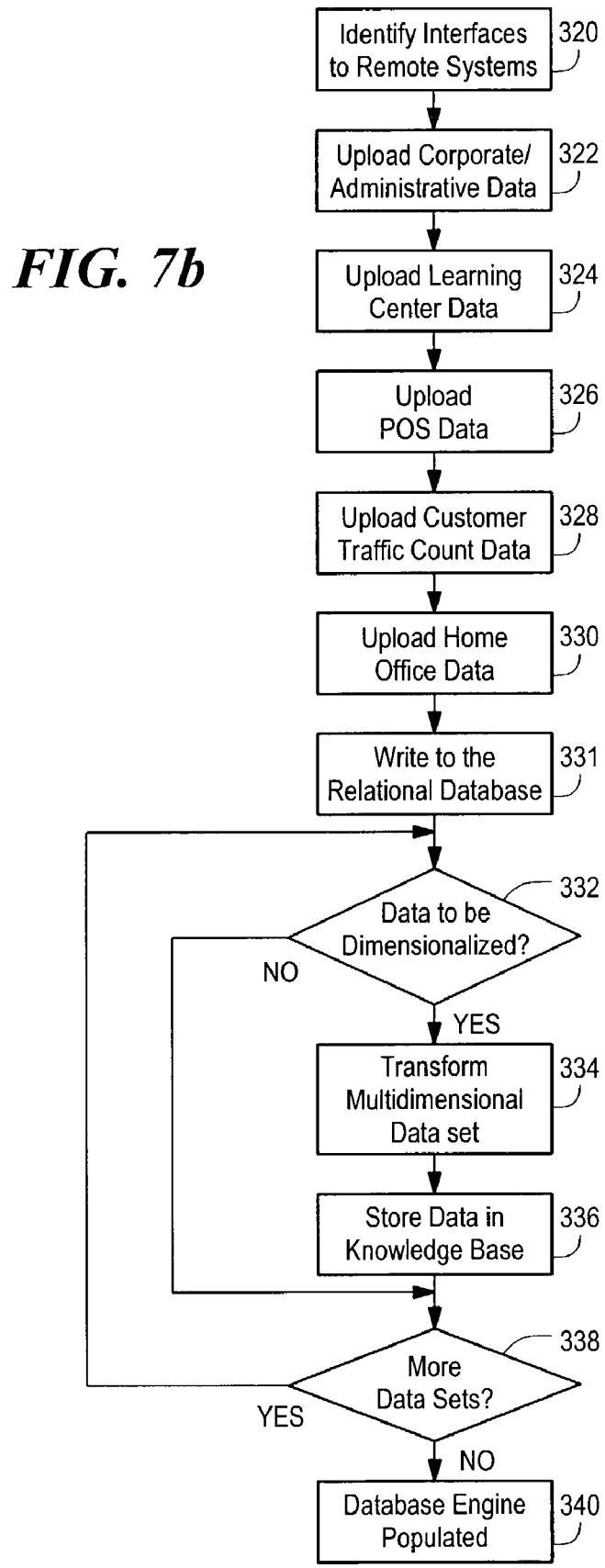
FIG. 7b is a flowchart of data gathering.

FIG. 7b shows a flowchart of data gathering. Referring to FIGS. 7b and 4, a plurality of data interfaces to remote systems are identified, as depicted at step 320, collectively 30. For each of the identified interfaces, data is gathered, or uploaded, to the database server 62 in PIMS 12. The interface may be offline batch interfaces, real time, data entry, or other mode of communication, depending on the remote system. For each of the remote systems, one or more data sets are uploaded. Corporate administrative, human resource, and sales and revenue projection/goal data is uploaded from the home office systems, as shown at step 322. Learning center data based on the recommended actions pursued is uploaded, such as courses completed, tests taken, and skills attained, as shown at step 324. Detailed POS data to determine performance matrices, such as units per transaction (UPT), dollars per transaction (DPT), and transactions per hour (TPH), described further below, is uploaded from each local store system, as disclosed at step 326. Customer traffic count data, which may also be from a local store system or from a separate sensor-based system, is uploaded, as shown at step 328. Home office data, such as merchandising, store attribute, and human resource data for staffing information, is uploaded, as depicted at step 330. Each data set is then written to the relational database 64 in a normalized form, as disclosed at step 331. For each data set, a check is performed to see if the data set is to be dimensionalized and stored in the multidimensional knowledge base 66, as shown at step 332. If the data is not to be mirrored in the knowledge base 66, then control advances to step 338. If it is, than the data set is transformed to a multidimensional data set, as depicted at step 334. The data is then stored in the knowledge base 66, as shown at step 336. A check is performed to determine if there are any more uploaded data sets, as shown at step 338. If there are more data sets, control reverts to step 332, otherwise the database server is populated for this iteration of transaction data, as shown at step 340.

Figure 7C:
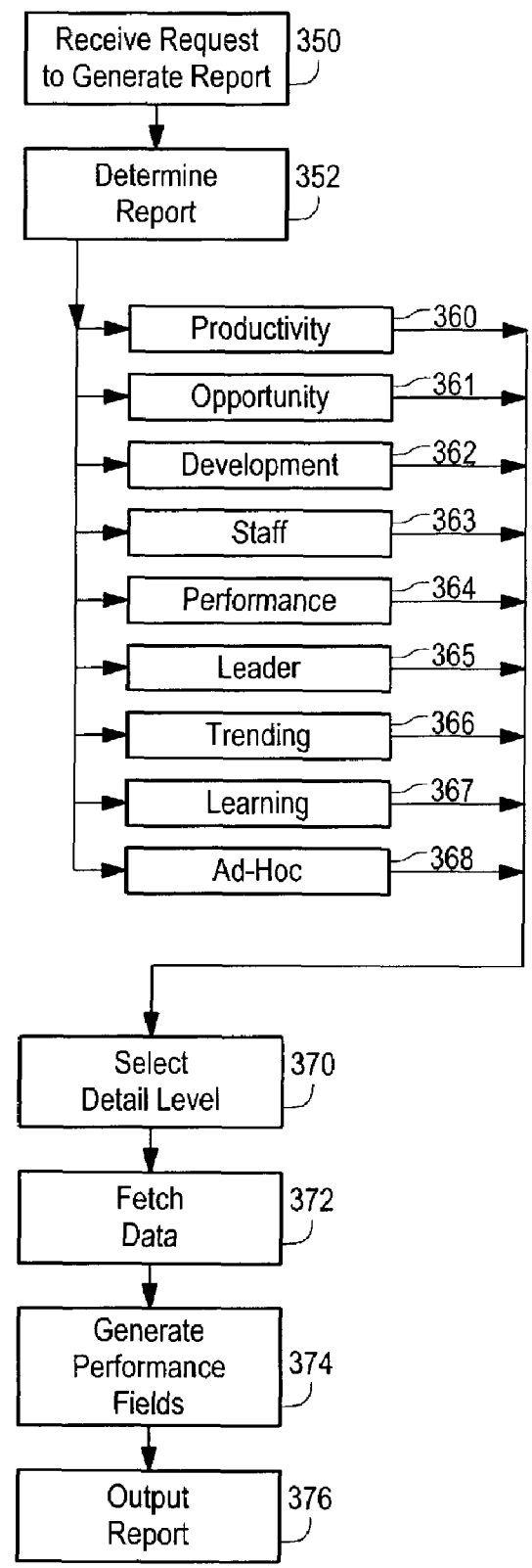
FIG. 7c is a flowchart of the analysis of results.

FIG. 7c shows a flowchart of the analysis of results. Referring to FIGS. 7c and 4, PIMS 12 receives a request to generate a report, as depicted at step 350. The analysis engine 68 determines which of the reports 36 to generate, as shown at step 352. Depending on which report, the analysis engine selectively invokes generation of the particular report, as shown at steps 360-368. A detail level for the report is selected as depicted at step 370. The detail levels include sales employee, store, district, region, division, and company. Other levels could be similarly defined or omitted. The pertinent data is fetched from the database server 62, as disclosed at step 372. The quantitative performance fields for the report are generated, as shown at step 374, and the report output, as depicted at step 376.

Figure 7D:
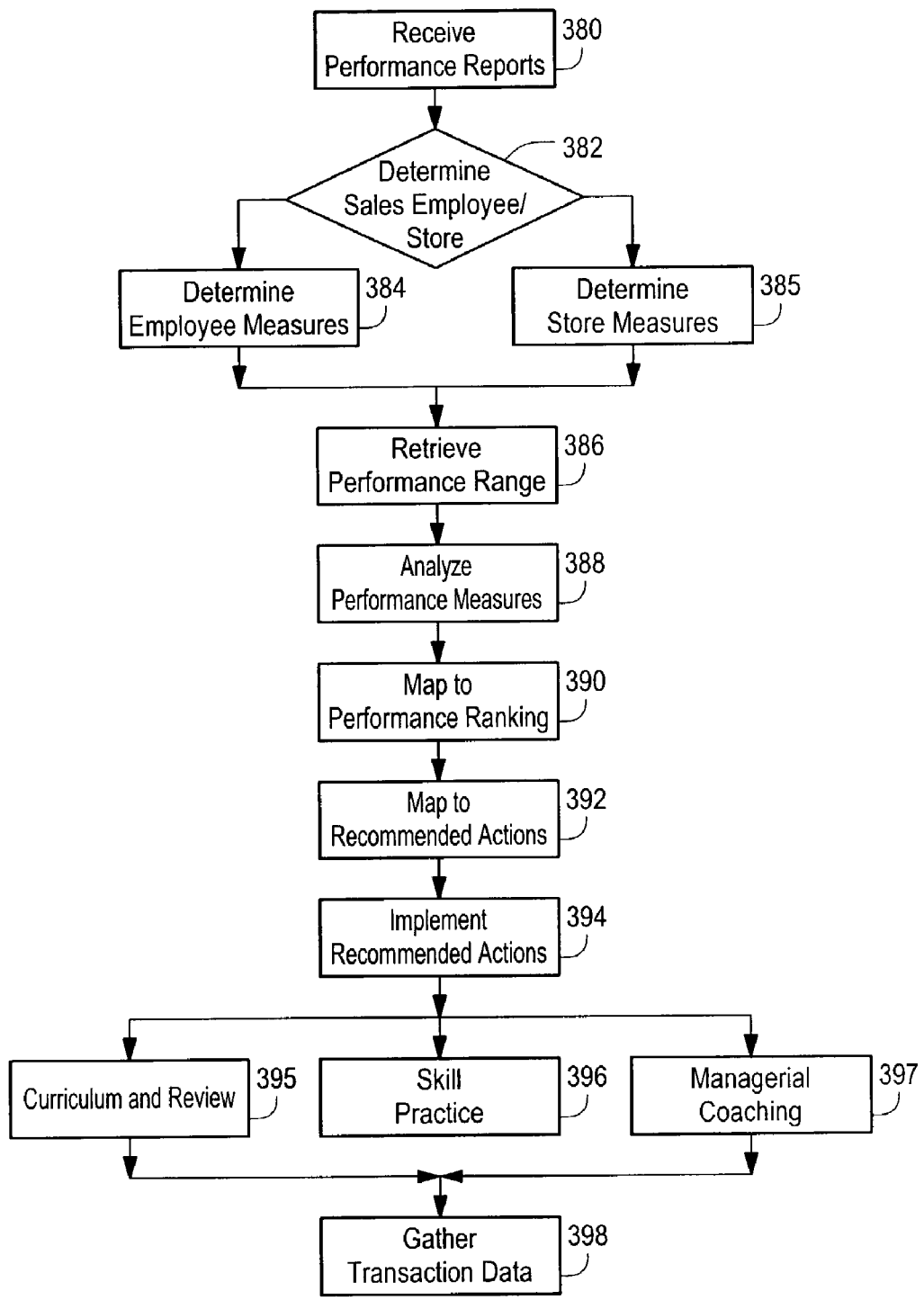
FIG. 7d is a flowchart of development analysis for determination of recommended actions.

FIG. 7d shows a flowchart of mapping and determination of recommended actions. Referring to FIGS. 7c and 4, a performance report is requested from PIMS 12, as depicted at step 380. A check is performed to determine if the report concerns a subject under observation of store or employee, as shown at step 382. The subject under observation may be, for example, one of the three tiers of sales employees: associate, advisor, or consultant, or a store (POS) location. If the subject under observation is an employee, then key employee performance measures are determined, as depicted at step 384. If the subject under observation is a store, then key store performance measures are determined, as depicted at step 385. For each of one or more performance measures, applicable to the subject under observation, a predetermined performance range corresponding to the performance field is retrieved, as disclosed at step 386. The performance range indicates expected values and typical statistical deviations, as derived from performance measures previously attained and other factors. The performance measures are then analyzed in light of the performance range, as shown at step 388, to generate a performance score. A performance ranking is determined by mapping the performance score to the performance range, as shown at step 390, to determine a discrete bin, such as "L", "M", and "H" for this performance field. The performance rankings are mapped to recommended actions using a recommended action matrix, as depicted at step 392 and discussed further below with respect to FIGS. 9a-9d. The appropriate recommended actions are then implemented, as shown at step 394, and may be implemented via curriculum and review 82 from the learning center 60, by skill practice at the POS 84, from managerial coaching 80, or by a combination, depending on the particular recommended action, as depicted at steps 395-397. The corresponding databases for storing the transaction data are then updated by another transaction data gathering, as shown at step 398.

Figure 8A:
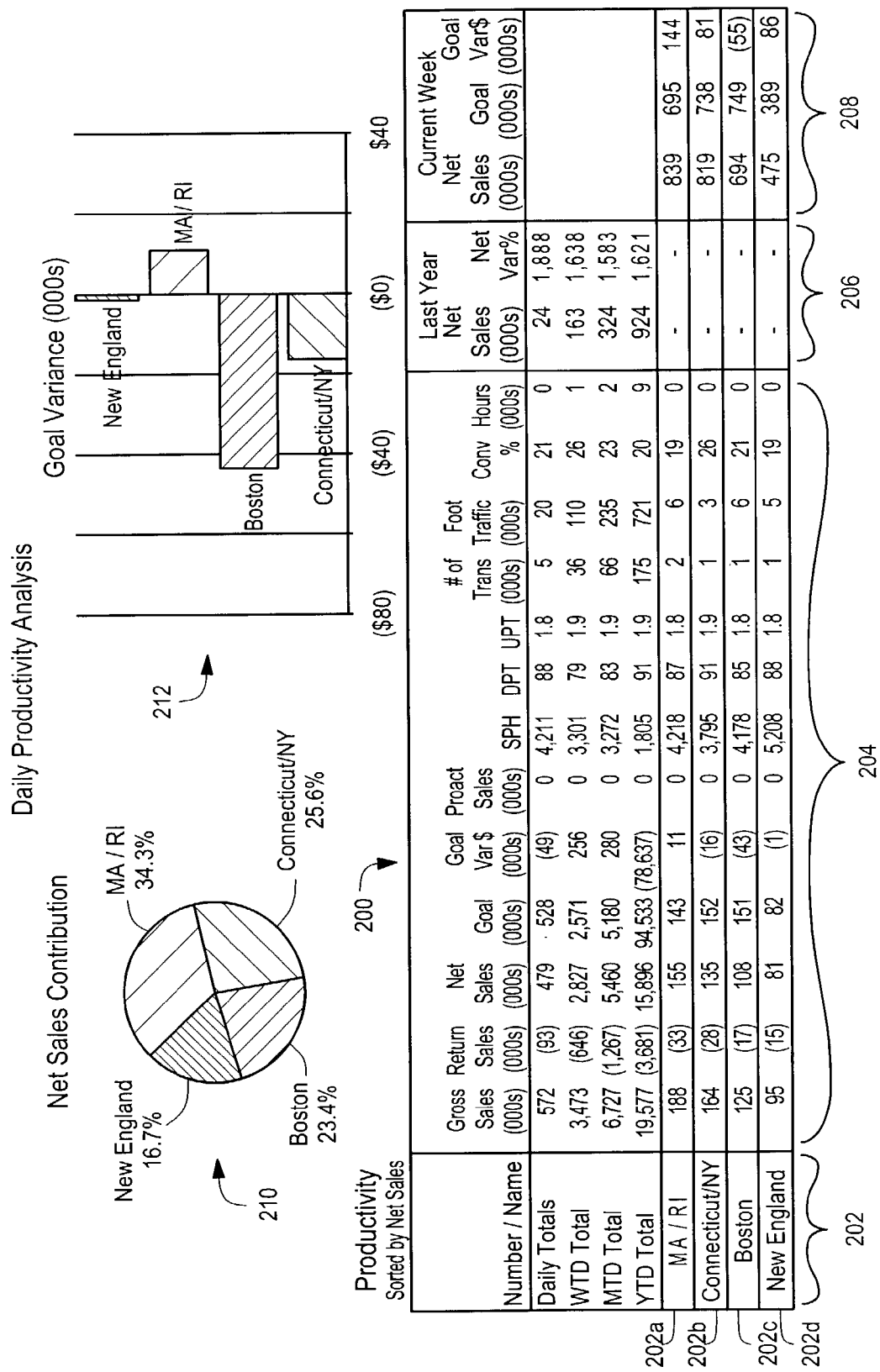

FIGS. 8a-8j show the standard reports 70 (FIG. 4) generated by PIMS. As indicated above, each of the reports concerns a particular subject under observation, such as a particular employee or store. Referring to FIG. 8a, a daily productivity analysis 200 is shown. Each subject under observation, individual stores in this report, is shown in column 202. The relevant performance fields are shown in the columns 204, which indicate the performance scores of each subject under observation 202 for each performance field. Additional comparison fields for the last year and current week are also shown in columns 206 and 208, respectively. Further, graphical illustrations of particular performance fields are shown. A net sales contribution 210 graph shows the relative contribution of each subject under observation, and a histogram of goal variance 212 illustrates relative achievement to facilitate comparison between subjects under evaluation.

For each of the performance fields 204, the performance scores can be compared to a predetermined performance range for the particular performance field. A performance ranking of low, medium, or high (L, M, H) is derived from the relative performance score within the performance range. As indicated above, other tier structures could also be employed. For example, a net sales performance range might specify low ("L") as 0-100, average ("A") as 101-150, and high ("H") as 151+. In this example, Connecticut 202b and Boston 202c have achieved an "A", the Massachusetts/Rhode Island area have achieved an "H" ranking, and New England has achieved a "L" ranking. The ranking is employed in mapping to recommended actions, described further below.

Figure 8B:
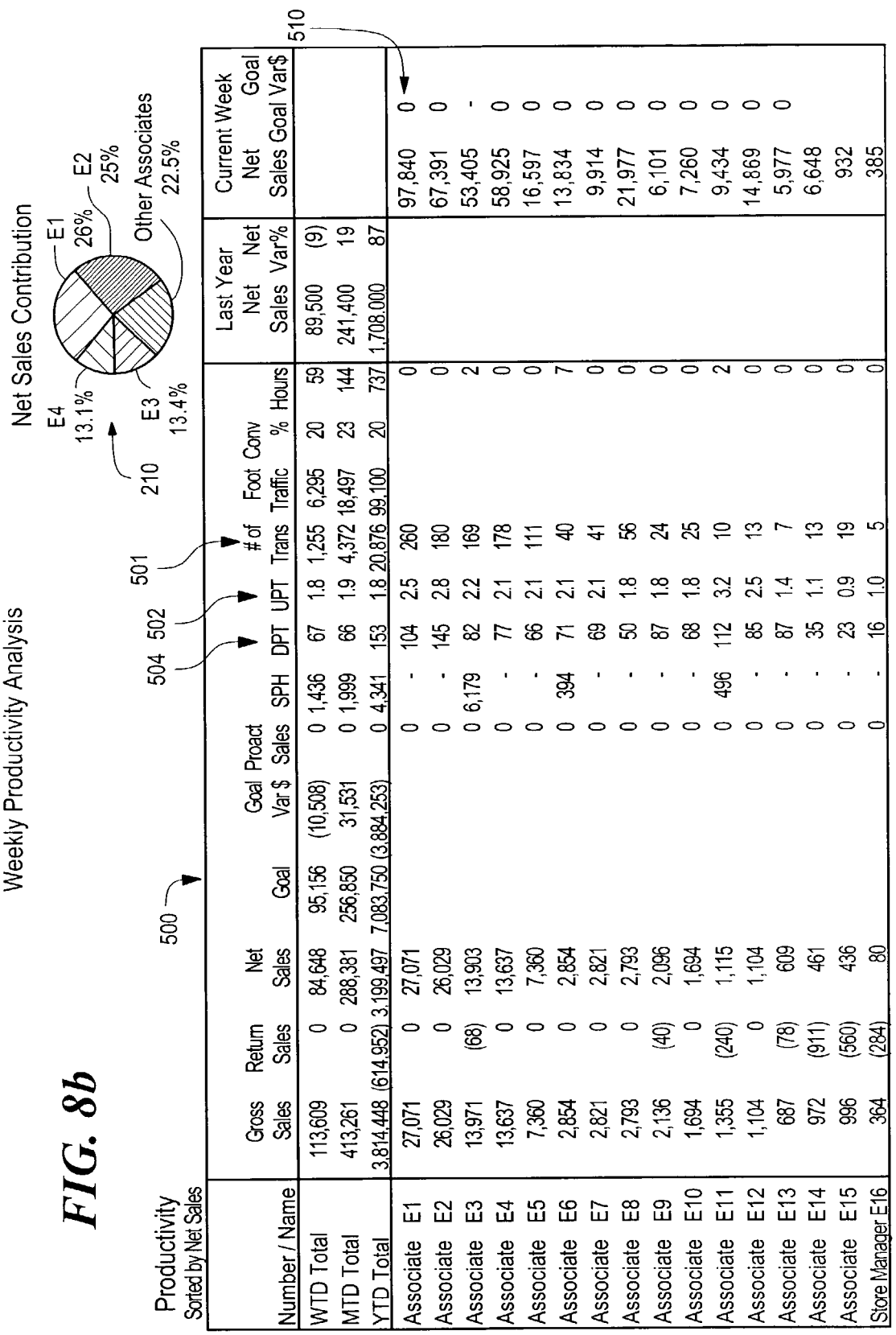

FIG. 8b shows another productivity analysis, encompassing a weekly timeframe, in which the subject under observation is the individual sales employee. Referring to FIG. 8b, the weekly productivity analysis 500 includes the performance fields # of transactions 501, Units Per Transaction 502, and Dollars Per Transaction 504. These fields will be discussed further below with respect to FIGS. 9a-9d.

Figure 8C:
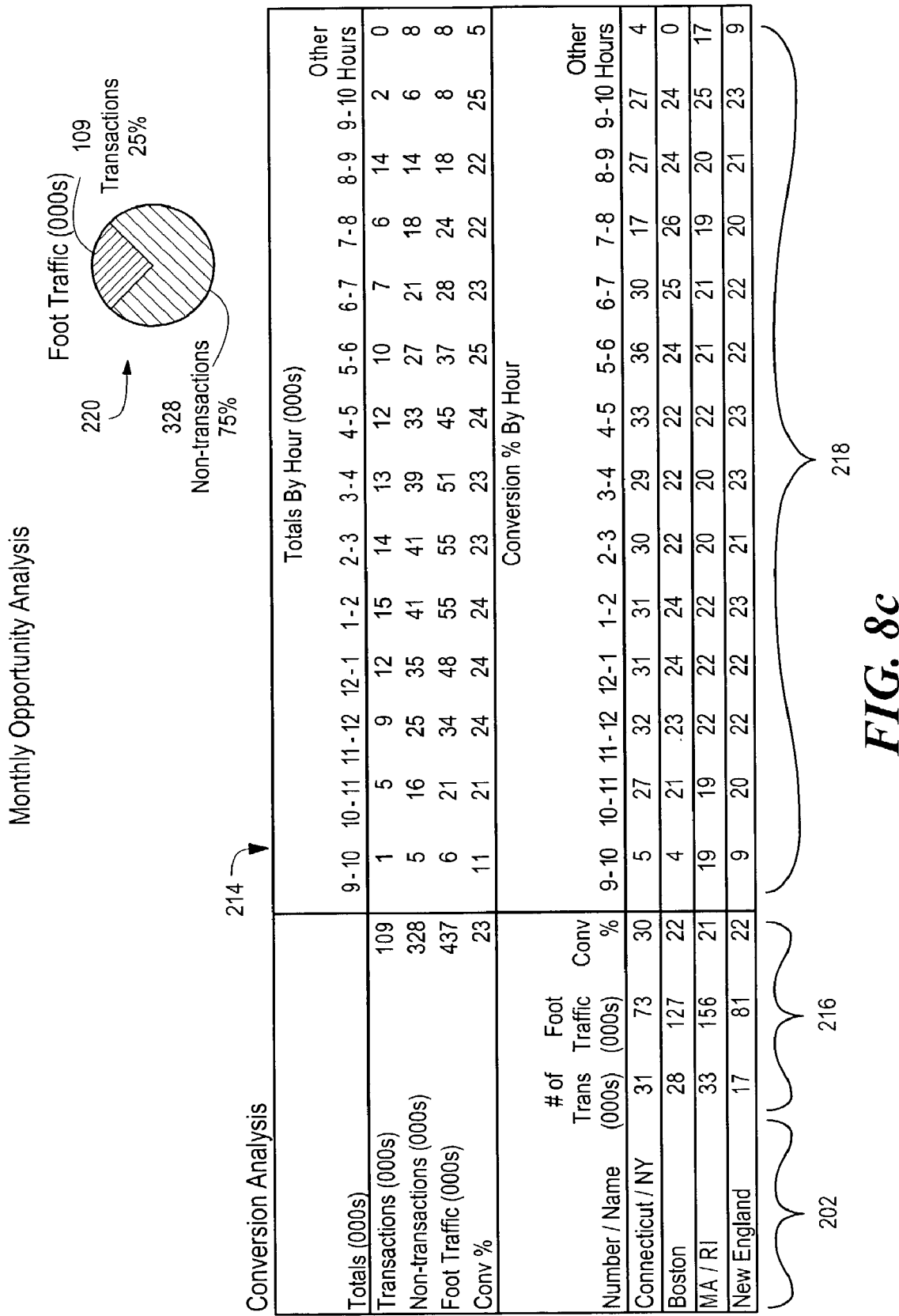

Referring to FIG. 8c, a monthly opportunity analysis 214 is shown. For each subject 202, columns 216 show the performance scores, and columns 218 further refine the scores on an hourly basis. A graph of the conversion percentage performance score 220 is also shown.

FIG. 8d shows a weekly opportunity analysis 214' reporting the performance of individual sales employees. This report is similar to the report in FIG. 8c, except that the subject under observation 202' is at the sales employee level, and the report covers a weekly timeframe. The report fields 218' are similar to the report fields 218 in FIG. 8c.

Referring to FIG. 8e, a development analysis 220 is shown. This report concerns an individual subject under observation 202, and includes performance fields shown by columns 222. Of particular relevance are the performance scores for DPH 224, UPT 226, and # of transactions 228, as these fields will be employed below in mapping to recommended actions.

Figure 8F:
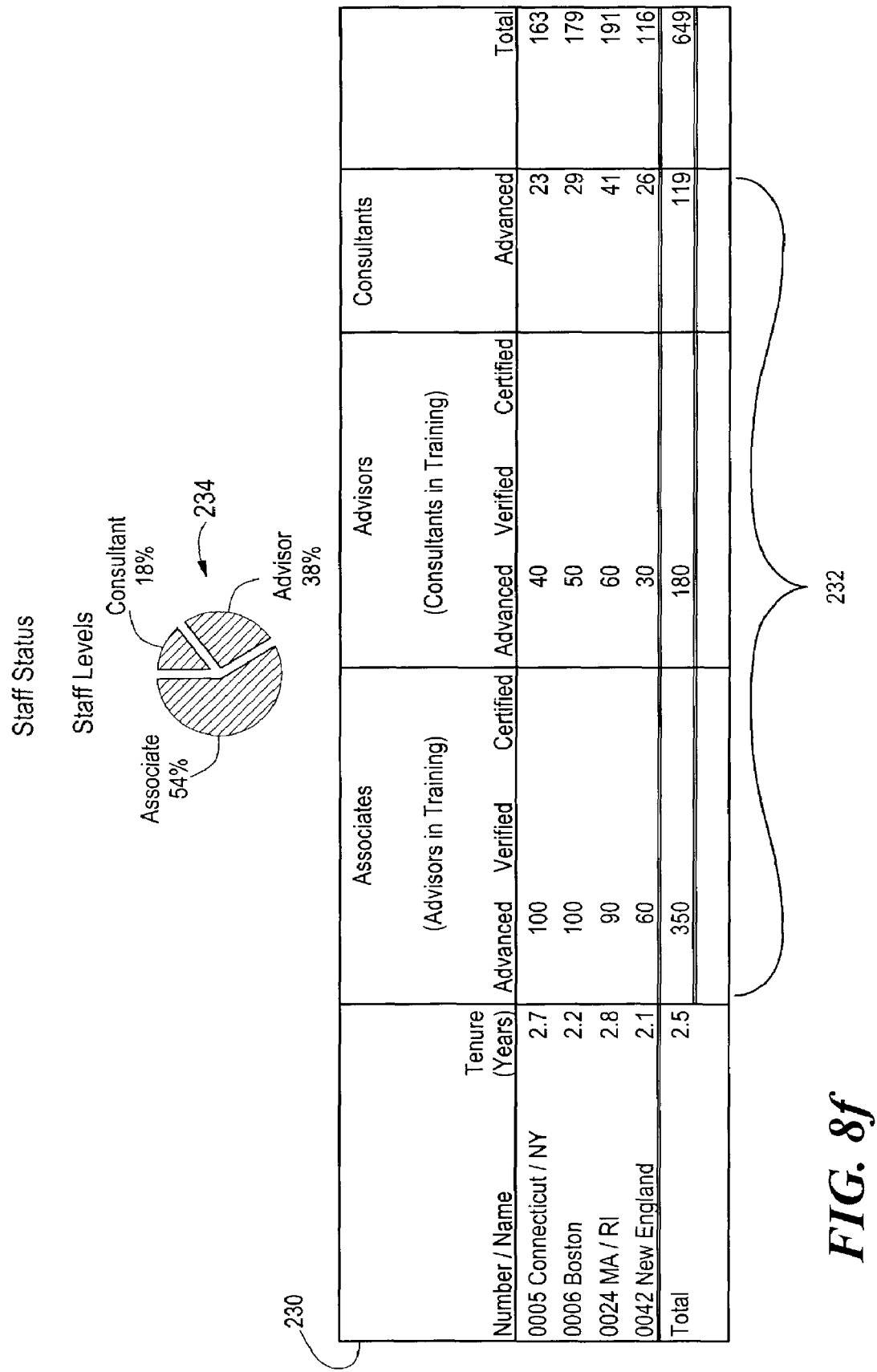

Referring to FIG. 8f, a staff status report 230 is shown. This report outlines the number of sales employees at each level. The number of each level of sales employee is shown in the fields 232, and a graph showing the relative percentage 234 is also shown. This information may be employed in developing a staffing profile.

Referring to FIG. 8g, a performance ranking 236 is shown. The performance ranking report ranks the top subjects under evaluation according one of the performance fields, net sales 240 in this case, however other fields could be employed in determining the ranking. The remaining performance fields are also shown in columns 238.

Figure 8H:
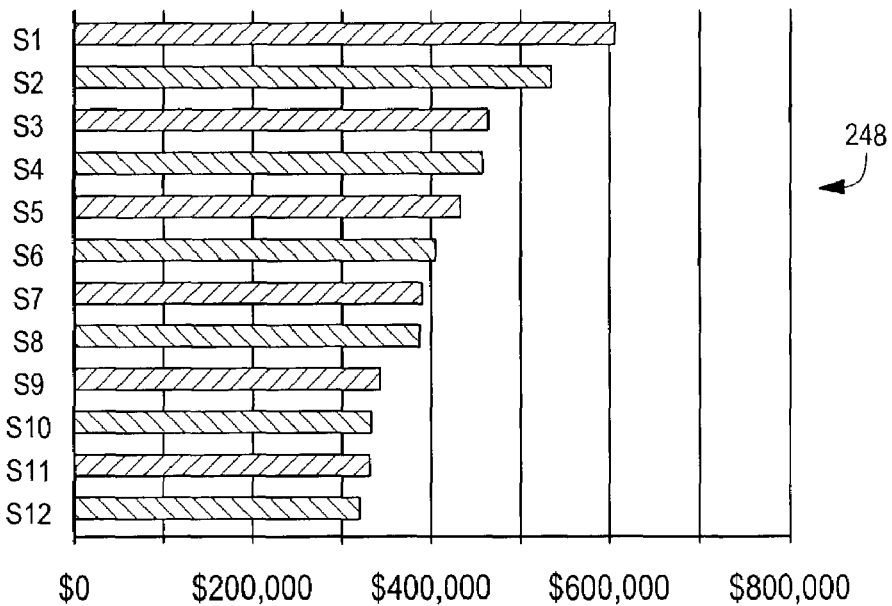

Referring to FIG. 8h, a leader board report 242 is shown. Each of the subjects under evaluation, store locations S1-S12 in this case, is shown in column 244. The column 244 is ordered based on the net sales performance field shown in column 246, and a histogram of the net sales 248 is also shown, thus showing relative differences between the subjects under evaluation.

Referring to FIG. 8i, a trending analysis report 250 is shown. Each of the subjects under evaluation is listed in column 252. The net sales performance field is shown in columns 254 for both actual and goal figures, allowing comparison between the actual and goal figures along with the performance metrics SPH, DPT, UPT, and TPH. This report, in an alternate embodiment, can also show proactive customer activities and staffing profile trends.

Referring to FIG. 8j, a learning history 256 report is shown for a particular subject under observation 257. This data comprises the learning center transaction data for indicating which curriculum have been undertaken a sales employee. A curriculum description 258 indicates the knowledge or skills that the course is intended to improve. As there may be multiple educational curricula targeted at a specific knowledge or skill, a actual course description 262 is also provided. The sequence description 260 indicates the type of sales employee that the course is designed for, associate, advisor, or consultant. The course results are displayed in columns 264, and are employed to indicate whether satisfactory results have been achieved for the particular skill or knowledge that the course is targeted.

It should be noted that the performance ranking may be adjusted to allow for qualitative assessments to be made based on the quantitative reports. In the reports, one or more of the performance scores may be employed in determining a ranking for mapping the subject to the recommended actions. Graphs are generally shown for performance scores deemed to be more pertinent to a particular performance ranking, but can be generated for other performance scores as well. Further, ad hoc reports (not shown) may also be employed in determining a ranking of a particular subject under observation before mapping the subject to recommended actions.

The reports illustrated in FIGS. 8a-8j are intended as illustrative; a variety of other detail levels and reporting time intervals can be provided. Appendix A illustrates further examples of reports which may be employed. In alternate embodiments, other permutations and combinations of reports may be provided; Appendix A is not intended to limit the present invention except as recited in the appended claims.

FIGS. 9a-9d show mapping of performance range scores to recommended actions. Referring to FIGS. 9a-9d, 8b and 4, and example of recommended action mapping is shown. An analysis of sales employee (subject under evaluation) E1 is shown as report entry 510. According to the productivity analysis 500, performance scores are as follows. For Number of Transactions 501, a score of 260. For Units Per Transaction 502, 2.5, and for Dollars Per Transaction DPT 504, a performance score of 104. Sales employee E1 is of sales employee type of associate, also as indicated by entry 510. Accordingly, the associate recommended action table 512 is employed in conjunction with the associate performance range shown in Table I. It should be noted that Table I is for illustrative purposes only; other performance ranges and standards could be employed.

TABLE I

| | Performance Score | | |
| --- | --- | --- | --- |
| | Low (L) | Medium (M) | High (H) |
| # Trans | 0-10 | 11-50 | 51+ |
| UPT | 0-1.2 | 1.3-2.5 | 2.6+ |
| DPT | 0-40 | 41-110 | 111+ |

Referring to the report 500, and to Table 1, comparing the performance score (260) with table 1 yields a rank of H (51+). For UPT, the performance score (2.5) also yields a rank of M (1.3-2.5). For DPT, the performance score of 104 yields a rank of M (41-110). Mapping the performance ranks into the recommended actions table for associates 512 indicates entry 516 (H, A, A), which determines two recommended action entries of 3 and a coaching action of "Congratulate on great job." The coaching activity will be undertaken by the manager 80, and the recommended action 3 maps further to a recommended action list 514. The recommended action list 514 lists entry 518, corresponding to curriculum 82 in sharing information to be pursued at the learning center 60.

The learning center 60 includes both a mechanism for administering the educational curricula and a mechanism for administering evaluations, or tests, which are indicative of the level of proficiency in a particular skill to which the curricula is directed at. The mechanism for administering the educational curricula is a PC platform coupled with a library of dedicated multimedia curriculum. The library of multimedia curriculum includes educational software and optional printed materials corresponding to each curriculum offering. Typically the PC platform would be located at the store (POS) and may be integrated with the POS data system. Alternately, the PC platform may be independent.

The tests are also provided by the learning center PC platform, and are administered to the sales employees and a resultant score stored as part of the transaction data from the learning center 60. The test scores are used to indicate proficiency at a particular skill, which is in turn used to indicate understanding of a particular skill set. The sales employee practices the skill set on the sales floor. With satisfactory results, the manager advances the sales employee to the next sales employee level.

The sales employees as defined herein include three types, or levels. Other levels may be defined, to include additional levels such as pre-associate, for example. Each sales employee level has a corresponding set of skills. Advancement to the next associate level is contingent upon proficiency in the core skill set of the current associate level. The three levels are as follows. An associate is a base level sales employee who has been certified by a store manager as having completed the associate learning curriculum, outlined below. A fourth level, pre-associate, may refer to a sales employee-in-training who is in the process of attaining proficiency in the skill set of an associate. An advisor has attained proficiency in the associate level skill set and the advisor skill set, which is focused on advanced client activity as enumerated below. A consultant has attained proficiency in the associate skill set, advisor skill set and the consultant skill set, which is focused on proactive client activity. Other skill sets and sales employee advancement criteria may be defined. Skill set categories and the skills within them for each sales employee are illustrated in Tables II, III, and IV for associates, advisors, and consultants, respectively.

TABLE II

| Associate Level |
| --- |
| Preparing Yourself: |
| Perform Strategic Activity<br>Acknowledge Clients<br>Assess Readiness<br>Engaging Clients: |
| Conduct Passby<br>Conduct Mirroring<br>Prepare Re-Engage<br>Share Information: |
| Gather Information<br>Share Knowledge<br>Say Goodbye |

TABLE III

| Advisor Level |
| --- |
| Understanding Needs: |
| Recognize Triggers<br>Unlock Triggers<br>Gather Information<br>Creating Solutions: |
| Select Products<br>Create Stories<br>Present Solutions<br>Balancing Experiences: |
| Assess Readiness<br>Disengage Client<br>Engage Client |

TABLE IV

| Consultant Level |
| --- |
| Offering Services: |
| Identify Candidates<br>Offer Opportunities<br>Record Information<br>Delighting Clients: |
| Set Next Step<br>Contact Clients<br>Conduct Appointments<br>Driving Business: |
| Develop Plan<br>Measure Activity<br>Grow Business |

Figure 10:
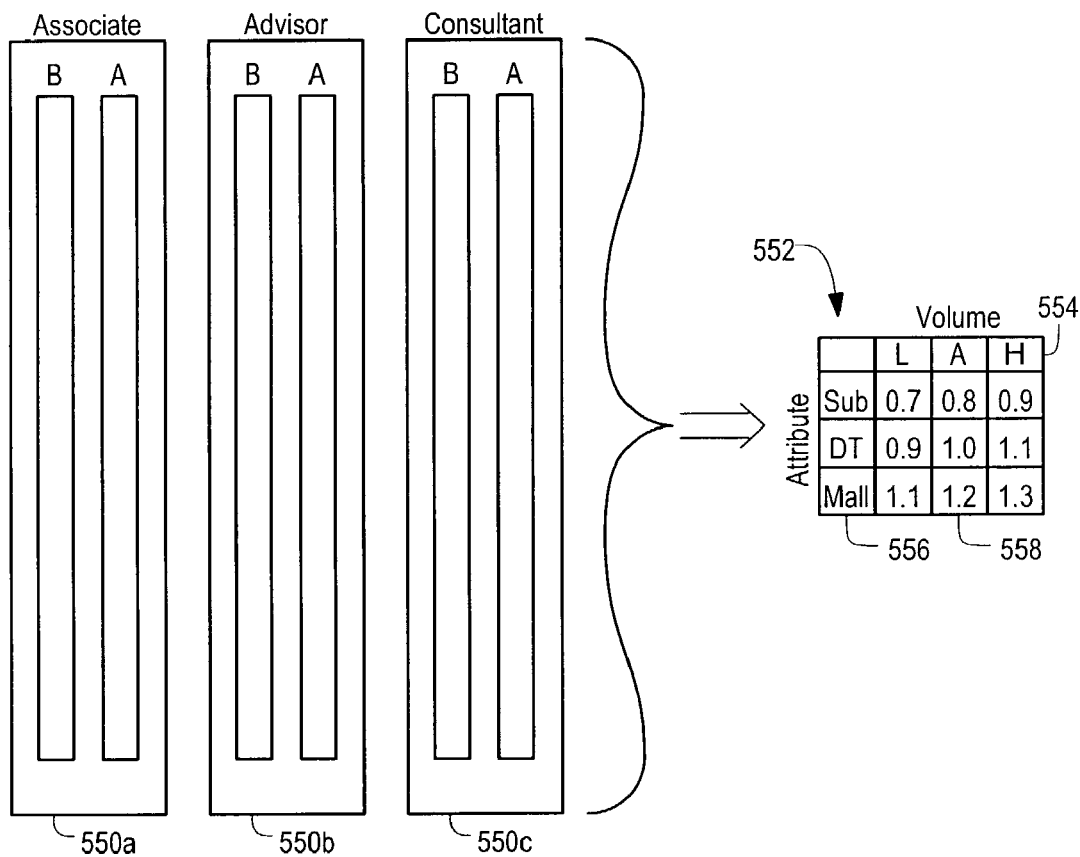
FIG. 10 is a matrix showing scaling of performance standards.

FIG. 10 shows scaling of performance standards. Other factors may exist which affect the performance model shown above beyond the individual sales employee. For example for each of the sales employee types, there may exist several experience levels, such as beginner and advanced. Also, store volume and store location may also affect the ability of a sales employee to meet certain performance criteria. Referring to FIG. 10, a set of performance standards 550 is shown for each of the three sales employee types. Each set of the performance standards 550a, 550b, and 550c, corresponding to associate, advisor, and consultant, respectively, is shown with a beginner (B) set and an advanced (A) set. Each set of performance standards (Table 1) is modified by a scaling matrix 552 indicative of store characteristics which are pertinent to sales activity at the store. The characteristics are represented by scaling factors in the scaling matrix. The scaling matrix 552 has an axis representing store volume 554 and an axis representing store location type 556. The store volume 554 indicates the relative number of sales in reference to other stores. The store location type 556 reflects relative customer profile and trading area characteristics. As shown in the matrix 552, a sales employee working in a store located in a mall having average sales volume would be subject to a performance score scaling factor of 1.2, as shown by entry 558. Other dimensions representing additional scaling factors may also be added to the scaling matrix. For example, a time component representing monthly or quarterly adjustments may be incorporated. Such a dimension can recognize trends such as, for example, retail sales tend to increase in December due to winter solstice holidays, followed by a slowdown in January. The sales employee's actual performance is then measured against the scaled performance standards and used to determine the L, A, H levels shown in FIGS. 9a-9c Performance reports are also employed to determined optimal staffing profiles for a store, in addition to individual performance improvement and measurement as described above. Depending on store workflow, there is an optimal mix of sales employees at various levels. Some stores may depend more on proactive sales typically generated by consultants, while other stores may experience significant foot traffic. Further, factors such as the conversion percentage—the number of foot traffic customers that result in a transaction—can indicate the likelihood that a customer will generate a transaction for an associate. These and other factors displayed in the reports are used to determine a staffing profile that determines the number of associates, advisors, and consultants that should be working at a particular time of day to maximize revenue.

For example, a mall store may experience significant foot traffic, but few repeat customers. Therefore, the mall store may benefit from a large number of associates to accommodate the high number of foot traffic customers, but may not have a large base of repeat customers for proactive sales by consultants. Conversely, a suburban store may experience less foot traffic, and therefore need fewer associates and advisors, but may rely more heavily on proactive sales generated by the consultants. The staffing profile is employed to optimize the mix of employee types and hence the customer-focused skill sets on the floor, based on the transaction data and the POS environment.

Those skilled in the art should readily appreciate that the programs for performance improvement and measurement as defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method for measuring and analyzing store performance comprising:
    collecting transaction data of store sales activity, utilizing a plurality of available data sources, the data comprising two or more of field performance data, external, and legacy data, and training data, and including customer visit count data, the collected transaction data being indicative of store performance factors;
    analyzing the collected transaction data with a computer processor to compute an aggregate synopsis of performance of a store employee as a subject under observation;
    hypothesizing using the aggregate synopsis, said hypothesizing developing a hypothesis for store improvement, the hypothesis determining at least one of a plurality of recommended actions for application to the subject under observation;
    applying the determined recommended actions to the subject under observation; and
    measuring a change in the store performance as a result of the subject under observation applying the determined recommended actions,
    wherein the field performance data includes data indicative of at least one of sales per hour (SPH), dollars per transaction (DPT), units per transaction (UPT), transactions per hour (TPH), traffic conversion percentage, customer traffic count, and periodic goals,
    wherein the hypothesizing is performed with an expert system, and
    wherein the store performance factors include one or more of gross sales, return sales, net sales, sales goals, dollars per transaction, and number of transactions,
    wherein the determined recommended actions include improving proficiency of skills of the subject under observation.

2. The method of claim 1 wherein measuring a change in store performance further comprises repeating the collecting, analyzing, hypothesizing, and applying in an iterative manner.

3. The method of claim 1 wherein hypothesizing further comprises:
    comparing the aggregate synopsis to performance scores within a predetermined performance range; and
    mapping the aggregate synopsis to the plurality of recommended actions based on the predetermined performance range.

4. The method of claim 3 wherein comparing further comprises providing a set of performance standards, each of the performance standards corresponding to at least a portion of the aggregate synopsis, the performance standards for determining a ranking within the predetermined performance range.

5. The method of claim 4 wherein the store employee has a plurality of levels and performance standards defined for each of the plurality of levels.

6. The method of claim 4 wherein the performance standards correspond to a subset of a predetermined set of customer focused skills attained by the store employee.

7. The method of claim 4 wherein the performance standards further comprise a scaling matrix operable to scale the performance scores, the scaling matrix having scaling factors corresponding to store characteristics pertinent to the transaction data.

8. The method of claim 7 wherein the scaling factors further comprise store volume, store location, and timing.

9. The method of claim 3 further comprising setting timely performance goals corresponding to the subject under observation, and adjusting the predetermined performance range in response to the performance goals.

10. The method of claim 9 wherein setting the timely performance goals further comprises setting goals according to at least one of daily, weekly, monthly, quarterly and yearly intervals.

11. The method of claim 9 further comprising establishing a staffing profile operable to attain the timely performance goal, the staffing profile indicative of optimal staffing levels for each of the store employee levels.

12. The method of claim 1 wherein a store, instead of a store employee, is the subject under observation and to whom the determined recommended actions are applied.

13. The method of claim 1 wherein the external and legacy data further includes at least one of administrative data, accounting data, tax data, market research data, merchandise grouping data, human resource data, and store revenue goal data.

14. The method of claim 1 wherein the aggregate synopsis further comprises report results corresponding to quantitative data.

15. The method of claim 1 wherein the transaction data corresponds to retail stores and sales employees.

16. The method of claim 1 wherein applying the determined recommended actions further comprises skill development at a sales employee level and business scenarios and strategies at a store level.

17. The method of claim 1 wherein the hypothesizing further comprises hypothesizing business scenarios and the recommended actions comprise strategies to improve business operations and staffing profiles for increased sales.

18. The method of claim 17 wherein the staffing profile further comprises an optimal aggregation of sales employees of different skill levels.

19. A computer system for analyzing employee and store performance comprising:
a transactional data store operable to store transactional data of store sales activity from a plurality of available data sources including field performance data, external, and legacy data and training data, the stored transactional data being indicative of performance of a store and performance of a store employee as a subject under observation;
an analysis engine coupled to receive the transactional data from the data store, the analysis engine operable to compute an aggregate synopsis of performance of the subject under observation from the transactional data; and
a hypothesizer responsive to the analysis engine and operable to develop a hypothesis for store improvement and to determine at least one recommended action for the subject under observation from the aggregate synopsis, the at least one recommended actions directed to improving the performance of the store,
wherein the field performance data includes data indicative of at least one of sales per hour (SPH), dollars per transaction (DPT), units per transaction (UPT), transactions per hour (TPH), traffic conversion percentage, customer traffic count, and periodic goals,
wherein the hypothesizer comprises an expert system, and
wherein the store performance is measured by one or more of gross sales, return sales, net sales, sales goals, dollars per transaction, and number of transactions,
wherein the determined at least one recommended action includes improving proficiency of skills of the subject under observation.

20. The system of claim 19 further comprising a feedback mechanism for monitoring the recommended actions and gathering, in an iterative manner, additional transactional data indicative of an effect of the implemented recommended actions.

21. The system of claim 19 further comprising a security schema operable to provide selective access to the transactional data, selective access determined as a function of a need to know and of a user's store management role within the sales organization.

22. The system of claim 19 further comprising a learning center adapted to implement the determined recommended actions.

23. The system of claim 20 wherein the feedback mechanism is further operable to monitor an advancement cycle of a store employee based on the gathered transactional data and a management certification.

24. The system of claim 19 further comprising a plurality of transactional data systems operable to gather the transactional data.

25. The system of claim 19 wherein the transactional data store further comprises a database adapted to store a plurality of normalized data records and a knowledge base adapted to store aggregated data having a plurality of granularity levels.

26. The system of claim 19 wherein the analysis engine is further operable to generate a plurality of performance scores, each of the performance scores adapted to be compared to a predetermined performance range.

27. The system of claim 26 wherein the hypothesizer is further operable to receive the predetermined performance range, and compare the performance scores to the predetermined performance range.

28. The system of claim 27 wherein the hypothesizer further comprises a mapper operable to determine a recommended action based on the comparing by mapping the aggregate synopsis to at least one of a plurality of the recommended actions.

29. The system of claim 27 wherein the hypothesizer is further operable to determine a ranking in the performance range and map the ranking into a predetermined list of recommended actions.

30. The system of claim 19 wherein the subject under observation further comprises a store employee having a level, wherein the level corresponds to a set of defined performance standards.

31. The system of claim 30 further comprising a predetermined set of customer-focused skills corresponding to the level of the store employee.

32. The system of claim 30 further comprising a scaling matrix operable to scale the performance standards, the scaling matrix having scaling factors corresponding to store characteristics pertinent to the transaction data.

33. The system of claim 32 wherein the scaling factors further comprise store volume, store location, and timing.

34. The system of claim 26 further comprising timely performance goals corresponding to the subject under observation, and adjusting the predetermined performance range in response to the performance goals.

35. The system of claim 34 wherein the timely performance goals further comprises periodic intervals according to at least one of hourly, daily, weekly, monthly, quarterly and yearly intervals.

36. The system of claim 19 wherein the hypothesizer is further operable to provide output indicative of optimal staffing profiles.

37. The system of claim 19 wherein the hypothesizer further comprises an operator for manual inspection of the computed aggregate synopsis.

38. The system of claim 19 wherein a store, instead of a store employee, is the subject under observation and for whom the at least one recommended actions is determined.

39. The system of claim 19 wherein the expert system is further operable for qualitative analysis.

40. The system of claim 19 wherein the at least one recommended action further corresponds to a library of multimedia solutions, the multimedia solutions adapted to provide educational development of skill and knowledge.

41. The system of claim 40 wherein the multimedia solutions further comprise a curricula of educational coursework materials.

42. The system of claim 40 wherein the multimedia solutions further comprise interactive and passive delivery and feedback mediums including magnetic, optical, and printed materials.

43. The system of claim 19 wherein the analysis engine is further operable to compute quantitative data and the hypothesizer is operable to generate qualitative conclusions.

44. A computer-implemented method for improving store productivity comprising:
gathering transaction data of store sales activity from a plurality of available computer data sources, the data including at least one of external, and legacy data, field performance data, and training data, and including sales activity corresponding to at least one employee;
analyzing the gathered transaction data with a computer processor to determine a ranking of employee performance, the gathered transaction data indicative of revenue generation and skill proficiency of each of the at least one employee;
defining a set of recommended actions directed at improving store productivity as a function of the at least one employee's skill proficiency and revenue generation;
correlating the ranking with the set of recommended actions for the at least one employee;
implementing, based on the correlating, at least one of the recommended actions; and
measuring productivity improvement of the store resulting from the implementing of the at least one recommended actions by the at least one employee,
wherein the field performance data includes data indicative of at least one of sales per hour (SPH), dollars per transaction (DPT), units per transaction (UPT), transactions per hour (TPH), traffic conversion percentage, customer traffic count, and periodic goals,
wherein defining a set of recommended actions is performed by an expert system, and
wherein the productivity improvement of the store is measured by one or more of gross sales, return sales, net sales, sales goals, dollars per transaction, and number of transactions,
wherein the set of defined recommended actions include improving proficiency of skills of the at least one employee.

45. The method of claim 44 wherein measuring further comprises repeating the gathering and analyzing.

46. The method of claim 44 further comprising iterating through the gathering, analyzing, correlating, and implementing, and tracking the results over time.

47. The method of claim 44 further comprising:
defining a staffing profile indicative of an optimal combination of employees based on the performance data;
implementing the staffing profile, wherein measuring further comprises measuring revenue generation in response to the implemented staffing profile.

48. A computer-implemented method for assessing, and improving the performance of a store comprising:
gathering, via a sales transactional data interface, from a plurality of available computer data sources, at least one of field performance data, legacy data, training data, and transactional data, the gathered data indicative of the revenue generating performance of at least one subject employee;
aggregating and storing, via a data store, the gathered transactional data;
generating, via an analysis engine having a processor, quantitative reports indicative of aggregate revenue generating performance of the at least one subject employee;
determining, based on the quantitative reports and a performance range, a performance ranking corresponding to the at least one subject employee;
identifying, via a hypothesizer for improving store performance, areas for improvement for the at least one subject employee based on the performance ranking;
mapping, via a qualitative mapping engine, the identified areas for improvement into a predetermined list of recommended actions for the at least one employee, the recommended actions for at least improving proficiency of skills;
implementing, via a learning center, the mapped recommended actions by the at least one employee; and
measuring, via subsequently gathered transactional data, the effect of the mapped recommended actions on the revenue generating performance of the at least one employee and the store,
wherein the field performance data includes data indicative of at least one of sales per hour (SPH), dollars per transaction (DPT), units per transaction (UPT), transactions per hour (TPH), traffic conversion percentage, customer traffic count, and periodic goals,
wherein the hypothesizer comprises a rule-based expert system, and
wherein the effect on the revenue generating performance is measured by one or more of gross sales, return sales, net sales, sales goals, dollars per transaction, and number of transactions.

49. The method of claim 48 wherein the transactional data further comprises sales data, and customer flow data.

50. The method of claim 48 wherein the qualitative mapping engine further comprises a predetermined correlation of a type of employee, the performance ranking and the recommended actions.

51. The method of claim 50 wherein the predetermined correlation corresponds to a matrix.

52. The method of claim 48 further comprising:
defining a staffing profile indicative of an optimal combination of employee types, based on the performance data, the optimal combination including the skills of each employee; and
implementing the staffing profile, wherein measuring further comprises measuring revenue generation in response to the implemented staffing profile.

53. The method of claim 48 wherein the learning center further comprises a library of multimedia curriculum.

54. The method of claim 48 wherein the transaction data is retail sales data.

55. A system for analyzing employee and store performance data comprising:
means for utilizing a plurality of available computer generated data and gathering therefrom sales transaction data indicative of store performance factors;
means for analyzing the gathered sales transaction data to compute an aggregate synopsis of performance of a store employee as a subject under observation;
means for hypothesizing the improvement in store performance based on the computed aggregate synopsis, said hypothesizing means further determining at least one of a plurality of recommended actions to be applied to the subject under observation;
means for applying the determined recommended actions to the subject under observation; and means for measuring a change in the performance of the store as a result of application of the determined recommended actions, wherein the sales transaction data includes data indicative of at least one of sales per hour (SPH), dollars per transaction (DPT), units per transaction (UPT), transactions per hour (TPH), traffic conversion percentage, customer traffic count, and periodic goals, wherein the means for hypothesizing comprises an expert system, and wherein the change in the performance of the store is measured by one or more of gross sales, return sales, net sales, sales goals, dollars per transaction, and number of transactions, wherein the at least one of a plurality of determined recommended actions include improving proficiency of skills of the subject under observation.

* * * * *